US012707148B1

(12) United States Patent
Mireault et al.

(10) Patent No.: US 12,707,148 B1
(45) Date of Patent: Aug. 11, 2026

(54) INTEGRATED ARCHITECTURE FOR ROTATIONAL ACTUATION OPTICAL IMAGE STABILIZATION

(71) Applicant: Apple Inc., Cupertino, CA (US)

(72) Inventors: Alfred N Mireault, San Francisco, CA (US); Scott W Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 18/583,692

(22) Filed: Feb. 21, 2024

Related U.S. Application Data

(60) Provisional application No. 63/578,643, filed on Aug. 24, 2023.

(51) Int. Cl.

| | |
|---|---|
| ***H04N 23/68*** | (2023.01) |
| ***G03B 5/00*** | (2021.01) |
| ***G03B 11/04*** | (2021.01) |
| ***G03B 13/36*** | (2021.01) |
| ***H04N 23/54*** | (2023.01) |

(52) U.S. Cl.
CPC ............. *H04N 23/687* (2023.01); *G03B 5/00* (2013.01); *G03B 11/04* (2013.01); *G03B 13/36* (2013.01); *H04N 23/54* (2023.01); *G03B 2205/0069* (2013.01)

(58) Field of Classification Search
CPC ........ H04N 23/687; H04N 23/54; G03B 5/00; G03B 11/04; G03B 13/36; G03B 2205/0069
See application file for complete search history.

(56) References Cited

U.S. PATENT DOCUMENTS

| | | | |
|---|---|---|---|
| 9,910,291 | B2 | 3/2018 | Kim et al. |
| 10,310,290 | B2 | 6/2019 | Yu et al. |
| 10,330,886 | B2 | 6/2019 | Shim et al. |
| 2009/0103194 | A1 | 4/2009 | Chen |

(Continued)

FOREIGN PATENT DOCUMENTS

| | | |
|---|---|---|
| CN | 212658927 U | 3/2021 |
| CN | 218958770 U | 5/2023 |

(Continued)

OTHER PUBLICATIONS

U.S. Appl. No. 19/315,223, filed Aug. 29, 2025, Andrew J. Jozefov, et al.

(Continued)

*Primary Examiner* — Gevell V Selby
(74) *Attorney, Agent, or Firm* — Robert C. Kowert; Kowert, Hood, Munyon, Rankin & Goetzel, P.C.

(57) ABSTRACT

Various embodiments include an integrated architecture for an actuator arrangement of a camera system. Among other things, the integrated architecture may enable rotational actuation optical image stabilization (OIS). In various embodiments, the actuator arrangement for rotating a lens group together with an image sensor to provide OIS. According to various embodiments, the actuator arrangement may also be configured to move the lens group or the image sensor to provide autofocus (AF). Furthermore, the camera system may include a suspension arrangement to suspend the lens group and the image sensor and to allow motion enabled by the actuator arrangement.

20 Claims, 12 Drawing Sheets

(56) References Cited

U.S. PATENT DOCUMENTS

| | | | | |
|---|---|---|---|---|
| 2014/0009631 | A1* | 1/2014 | Topliss | H04N 23/687 348/208.11 |
| 2015/0365568 | A1 | 12/2015 | Topliss | |
| 2018/0063438 | A1 | 3/2018 | Miller et al. | |
| 2018/0367711 | A1 | 12/2018 | Topliss | |
| 2019/0196300 | A1* | 6/2019 | Kim | H02K 41/0356 |
| 2021/0072494 | A1 | 3/2021 | Zhu et al. | |
| 2021/0294069 | A1 | 9/2021 | Miller | |
| 2023/0128842 | A1* | 4/2023 | Lee | H04N 23/55 348/208.11 |
| 2023/0161226 | A1 | 5/2023 | Bunting | |
| 2023/0199313 | A1* | 6/2023 | Hubert | H04N 23/687 348/208.7 |
| 2024/0040254 | A1* | 2/2024 | Kim | H04N 23/687 |
| 2024/0142856 | A1 | 5/2024 | Kim et al. | |
| 2024/0271605 | A1 | 8/2024 | Easton | |

FOREIGN PATENT DOCUMENTS

| | | | |
|---|---|---|---|
| CN | 114500776 | B | 3/2024 |
| KR | 20240037817 | A | 3/2024 |
| KR | 20240057273 | A | 5/2024 |
| TW | 200916872 | | 4/2009 |
| TW | 200921259 | | 5/2009 |
| WO | 2023231849 | | 7/2023 |
| WO | 2024014714 | A1 | 1/2024 |
| WO | 2024025071 | A1 | 2/2024 |

OTHER PUBLICATIONS

U.S. Appl. No. 19/315,209, filed Aug. 29, 2025, Andrew J. Jozefov, et al.

U.S. Appl. No. 18/473,117, filed Sep. 22, 2023, Qiang Yang, et al.

* cited by examiner

INTEGRATED ARCHITECTURE FOR ROTATIONAL ACTUATION OPTICAL IMAGE STABILIZATION

PRIORITY APPLICATION

This application claims benefit of priority to U.S. Provisional Application Ser. No. 63/578,643, entitled "Integrated Architecture for Rotational Actuation Optical Image Stabilization," filed Aug. 24, 2023, and which is hereby incorporated herein by reference in its entirety.

BACKGROUND

Technical Field

This disclosure relates generally to a camera that includes an actuator arrangement for rotating a lens group and an image sensor to provide optical image stabilization (OIS).

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 1A shows an example camera system in which the actuator arrangement includes an inner AF module (lens shift) and an outer OIS module that each have their respective set of actuator components. FIG. 1B shows another example camera system in which the actuator arrangement has an integrated architecture that enables OIS and lens shift AF.

FIG. 1C shows yet another example camera system in which the actuator arrangement has an integrated architecture that enables OIS and sensor shift AF.

FIG. 2A shows an exploded perspective view of the camera system. FIG. 2B shows an exploded side cross-sectional view of the camera system. FIG. 2C shows a perspective partial cross-sectional view of the camera system.

Figure 1A:
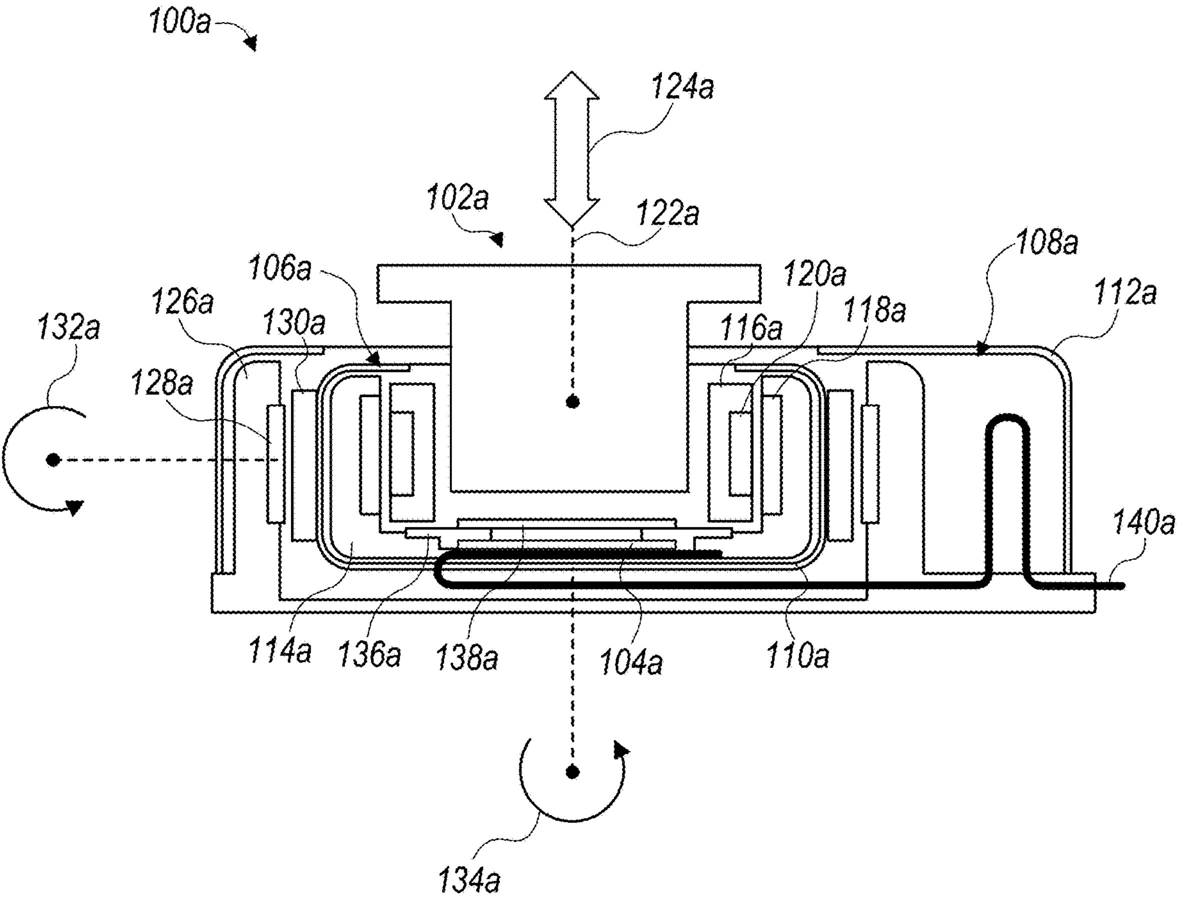
FIGS. 1A-1C illustrate views of respective example camera systems that include an actuator arrangement for rotating a lens group and an image sensor together to provide optical image stabilization (OIS) and for shifting the lens group or the image sensor to provide autofocus (AF), in accordance with various embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a camera system having an actuator arrangement for rotating a lens group together with an image sensor to provide optical image stabilization (OIS). In various embodiments, the actuator arrangement may also be configured to move the lens group or the image sensor to provide autofocus (AF). Furthermore, the camera system may include a suspension arrangement configured to suspend the lens group and the image sensor and to allow motion enabled by the actuator arrangement.

Multi-camera systems may be used, for example, in smart phone form-factors to allow a wider range of possible image captures. Modules may be given different zoom ratios, e.g., comprising fields of view (FOVs) ranging from telephoto to wide or super-wide. As compared to the camera systems disclosed herein, various other camera system designs may have OIS and AF mechanisms that must adapt to suit functional requirements of each individual module. A challenge for such OIS mechanisms on certain modules (e.g., ultra-wide modules with small focal lengths) is distortion that occurs over linear stroke.

To correct for the aforementioned distortion issue, the camera systems disclosed herein may be configured to rotate the lens group and the image sensor as a pair to achieve large compensation angle OIS with improved image quality (relative to those other camera systems that implement OIS using linear strokes). According to various embodiments, the camera systems disclosed herein include a design architecture that includes an actuator arrangement (e.g., a three-degrees-of-freedom (3DOF) actuator arrangement), a suspension arrangement (e.g., a ball bearing suspension arrangement), and/or a dynamic flex circuit.

According to various embodiments, the actuator arrangement may include one or more actuators configured to rotate the lens group and the image sensor (e.g., together, in lockstep) about multiple axes orthogonal to an optical axis of the camera system, e.g., to implement OIS. Furthermore, the actuator(s) may be configured to shift the lens group or the image sensor in at least one direction parallel to the optical axis, e.g., to implement AF. In some embodiments, to implement AF, the actuator(s) may shift the lens group, relative to the image sensor, in at least one direction parallel to the optical axis. In other embodiments, to implement AF, the actuator(s) may shift the image sensor, relative to the lens group, in at least one direction parallel to the optical axis.

The actuator(s) may include one or more voice coil motor (VCM) actuators in various embodiments. The VCM actuator(s) may include drive magnets and drive coils. In some embodiments, a respective drive coil may be positioned proximate a respective drive magnet, e.g., such that the respective drive coil, when driven with an electric current, is capable of electromagnetically interacting with the respective drive magnet. Lorentz forces resulting from the electromagnetic interaction may be used to move the lens group and/or the image sensor to implement OIS and/or AF as described herein.

The suspension arrangement may include a first movable component coupled with the lens group, and a second movable component coupled with the image sensor. The suspension arrangement may be configured to suspend the lens group and the image sensor and to allow motion (of the lens group and/or the image sensor) enabled by the actuator(s).

In various embodiments, the suspension arrangement may comprise a ball bearing suspension arrangement. The ball bearing suspension arrangement may include multiple stages that move on ball bearings to suspend the lens group and the image sensor and to allow motion enabled by the VCM actuator(s). For example, the multiple stages of the ball bearing suspension arrangement may include an Rx OIS stage, an Ry OIS stage, and/or an AF stage. The lens group may be fixedly coupled with the Rx OIS stage. The image sensor may be fixedly coupled with the AF stage.

The Rx OIS stage may be capable of pivoting on a first set of ball bearings disposed between the Rx OIS stage and the Ry OIS stage, e.g., so as to rotate the Rx OIS stage (and the lens group coupled therewith), together with the AF stage (and the image sensor coupled therewith), about a first axis orthogonal to the optical axis. The Ry OIS stage may be capable of pivoting on a second set of ball bearings disposed between the Ry OIS stage and a base structure of the camera system, e.g., so as to rotate the Ry OIS stage, together with the Rx OIS stage (and the lens group coupled therewith) and the AF stage (and the image sensor coupled therewith), relative to the base structure, about a second axis orthogonal to the optical axis and orthogonal to the first axis. In this manner, the Rx OIS stage and the Ry OIS stage may be used to rotate the lens group and the image sensor, together (as a pair), about multiple axis orthogonal to the optical axis to provide OIS.

The AF stage may be capable of moving on a third set of ball bearings disposed between the AF stage and the Rx OIS stage, e.g., so as to shift the AF stage (and the image sensor coupled therewith), relative to the Rx OIS stage (and the lens group coupled therewith), in at least one direction parallel to the optical axis. In this manner, the AF stage may be used to shift the image sensor relative to the lens group to provide AF.

According to some embodiments, the drive magnets may include an Rx OIS magnet, an Ry OIS magnet, and an AF magnet. The Rx OIS magnet and the Ry OIS magnet may be fixedly coupled with the Rx OIS stage, e.g., at different sides of the Rx OIS stage (and/or of the camera system). The AF magnet may be fixedly coupled with the AF stage, e.g., at a different side than each of the Rx OIS magnet and the Ry OIS magnet.

According to some embodiments, the drive coils may be fixed drive coils that are coupled with the base structure. For example, the drive coils may include an Rx OIS coil, an Ry OIS coil, and an AF coil. The Rx OIS coil may be fixedly coupled with the base structure and positioned proximate the Rx OIS magnet. The Ry OIS coil may be fixedly coupled with the base structure and positioned proximate the Ry OIS magnet. The AF coil may be fixedly coupled with the base structure and positioned proximate the AF magnet. In some embodiments, the camera system may further comprise a drive flex circuit wrapped around at least a portion of the base structure. The drive coils may be coupled with the drive flex circuit, e.g., such that the drive coils are coupled with the base structure via the drive flex circuit.

In some embodiments, the camera system may include a dynamic flex circuit which may have, for example, a first portion, a second portion, and a third portion. The first portion of the dynamic flex circuit may be coupled with one or more stationary components of the camera system (e.g., a shield can of the camera system). The second portion of the dynamic flex circuit may be coupled with the image sensor. The third portion of the dynamic flex circuit may extend from the first portion to the second portion. The dynamic flex circuit may be configured to convey electrical signals between the first portion (coupled with the stationary component(s)) and the second portion (coupled with the image sensor) via the third portion. According to various embodiments, the third portion of the dynamic flex circuit may have sufficient service loop to allow motion of the image sensor enabled by the VCM actuator(s).

The design architecture of the camera systems disclosed herein may enable an OIS solution for short focal length optical designs in an overall small package size. The design architecture may be scalable to larger strokes/compensation angles. Furthermore, as indicated herein, the design architecture may have strong disturbance rejection due to center of action matching and high bearing preloads. As previously indicated, the design architecture may include a sensor shift design, which may minimize lens translation. Moreover, the design architecture may include an integrated module design that enables compact sizing in multiple dimensions.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
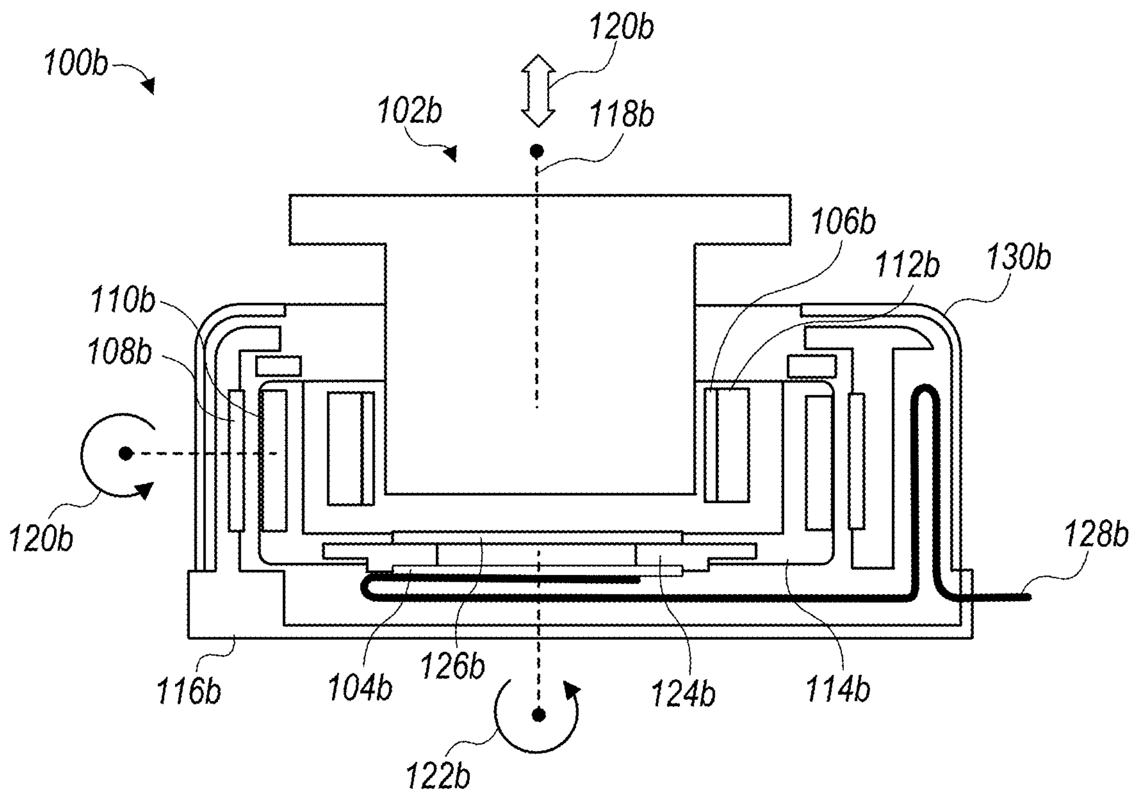
Figure 1C:
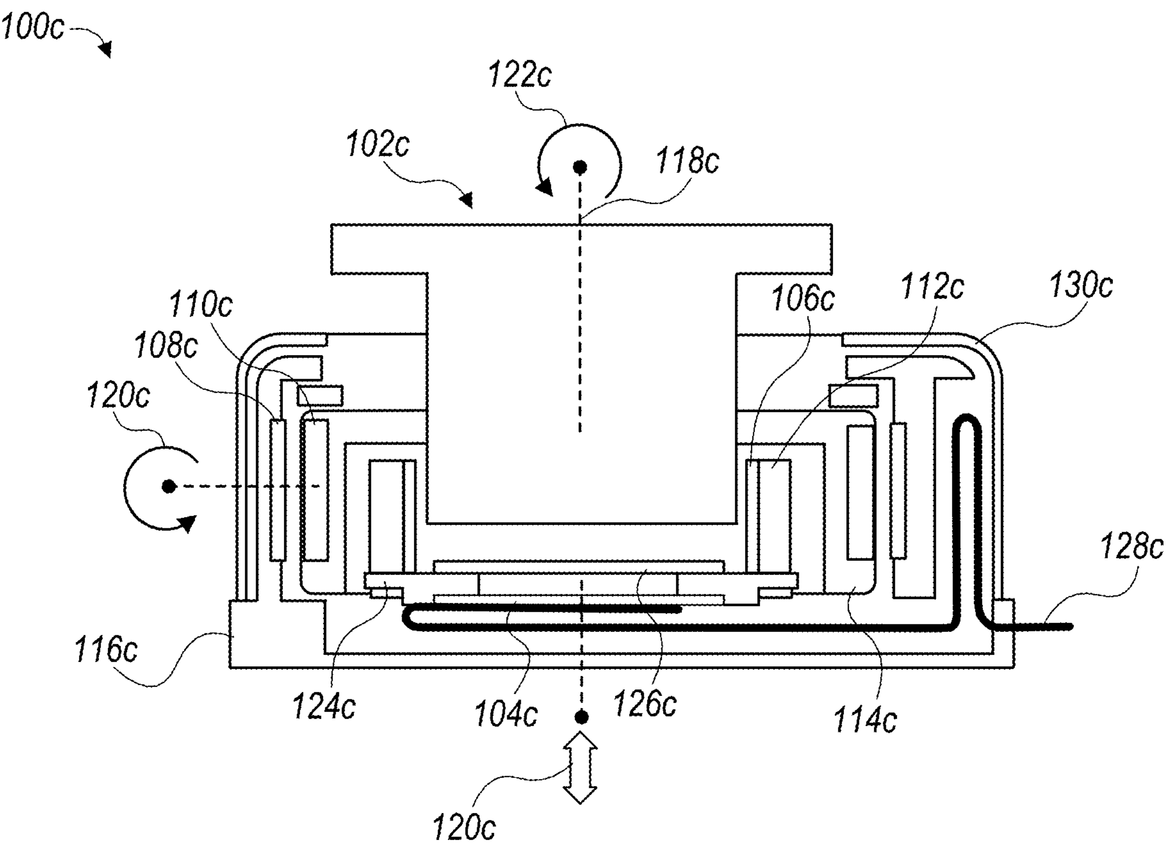

FIGS. 1A-1C illustrate views of respective example camera systems **100*a*-100*c* that include an actuator arrangement for rotating a lens group and an image sensor together to provide optical image stabilization (OIS) and for shifting the lens group or the image sensor to provide autofocus (AF), in accordance with various embodiments. FIG. 1A shows an example camera system 100*a* in which the actuator arrangement includes an inner lens shift AF module and an outer OIS module that each have their respective set of actuator components. FIG. 1B shows another example camera system 100*b* in which the actuator arrangement has an integrated architecture that enables OIS and lens shift AF. FIG. 1C shows yet another example camera system 100*c*** in which the actuator arrangement has an integrated architecture that enables OIS and sensor shift AF.

According to various embodiments, the camera system **100*a* in FIG. 1A may include a lens group 102*a*, an image sensor 104*a*, an inner lens shift AF module 106*a*, and an outer OIS module 108*a*. In some embodiments, the inner lens shift AF module 106*a* may include an inner shield can 110*a* that houses and/or at least partially encases an inner AF actuator and other camera components. The outer OIS module 108*a* may include an outer shield can 112*a* that houses and/or at least partially encases an outer OIS actuator and other camera components (e.g., including the inner lens shift AF module 106*a*) in some embodiments. As indicated in FIG. 1A, the inner lens shift AF module 106*a* and the outer OIS module 108*a* may each have their respective set of actuator components—the inner lens shift AF module 106*a* having the inner AF actuator, and the outer OIS module 108*a*** having the outer OIS actuator.

In some embodiments, the inner lens shift AF module **106*a* may include the inner AF actuator, a first carrier 114*a*, and a second carrier 116*a*. The AF actuator may include one or more AF coils 118*a* and one or more AF magnets 120*a*. According to some embodiments, the AF coils 118*a* and the image sensor 104*a* may be fixedly coupled with the first carrier 114*a*, e.g., as indicated in FIG. 1A. The AF magnets 120*a* and the lens group 102*a* may be fixedly coupled with the second carrier 116*a*, e.g., as indicated in FIG. 1A. It should be understood, however, that in other embodiments the AF magnets 120*a* may be fixedly coupled with the first carrier 114*a*, and the AF coils 118*a* may be fixedly coupled with the second carrier 116*a*. Furthermore, the first carrier 114*a* may be fixedly coupled with the inner shield can 110*a* in some embodiments. For example, the first carrier 114*a* may be attached to an inner surface of the inner shield can 110*a***.

According to various embodiments, a respective AF coil **118*a* may be located proximate a respective AF magnet 120*a* such that the respective AF coil 118*a*, when driven with an electric current, is capable of electromagnetically interacting with the respective AF magnet 120*a* to enable lens shift AF motion. For example, the lens shift AF motion may comprise movement of the second carrier 116*a* (and the lens group 102*a* coupled therewith), relative to the first carrier 114*a* (and the image sensor 104*a* coupled therewith), in at least one direction parallel to an optical axis 122*a* of the camera system 100*a*. In FIG. 1A, example direction(s) of the lens shift AF motion are indicated by double arrows 124*a***.

In some embodiments, the outer OIS module **108*a* may include the outer OIS actuator, a base structure 126*a*, and/or a third carrier (e.g., the inner shield can 110*a*). The OIS actuator may include one or more OIS coils 128*a* and one or more OIS magnets 130***a*. According to some embodiments, the OIS coils 128*a* may be fixedly coupled with the base structure 126*a*, e.g., as indicated in FIG. 1A. The OIS magnets 130*a* may be fixedly coupled with the inner shield can 110*a*, e.g., as indicated in FIG. 1A. It should be understood, however, that in other embodiments the OIS magnets 130*a* may be fixedly coupled with the base structure 126*a*, and the OIS coils 128*a* may be fixedly coupled with the inner shield can 110*a*.

According to various embodiments, a respective OIS coil 128*a* may be located proximate a respective OIS magnet 130*a* such that the respective OIS coil 128*a*, when driven with an electric current, is capable of electromagnetically interacting with the respective OIS magnet 130*a* to enable OIS motion. As previously discussed, to enable the OIS motion, the lens group 102*a* and the image sensor 104*a* are rotated as a pair. In various embodiments, the OIS motion may comprise rotation of the inner shield can 110*a* (and the inner lens shift AF module 106*a*, including rotation of the lens group 102*a* together with the image sensor 104*a*), relative to the base structure 126*a*, about multiple axes orthogonal to the optical axis 122*a*. For example, the inner shield can 110*a* may be rotated, relative to the base structure 126*a*, about a first axis orthogonal to the optical axis 122*a*. Furthermore, the inner shield can 110*a* may be rotated, relative to the base structure 126*a*, about a second axis orthogonal to the optical axis 122*a* and to the first axis. In FIG. 1A, arrows 132 and 134 are intended to generally represent rotational motion about each of two orthogonal axes, such as the first axis and the second axis.

In some embodiments, the camera system 100*a* may include a sensor package fixedly coupled with the first carrier 114*a*. For example, the sensor package may include the image sensor 104*a*, a substrate 136*a*, and/or an optical filter 138*a* (e.g., an infrared cut-off filter (IRCF)). As indicated in FIG. 1A, the image sensor 104*a* may be attached to the substrate 136*a*, and the substrate 136*a* may be attached to the first carrier 114*a*. The optical filter 138*a* may also be attached to the substrate 136*a* in some embodiments. The optical filter 138*a* may be positioned above the image sensor 104*a*, so that light passes through the optical filter 138*a* before it reaches the image sensor 104*a*.

According to some embodiments, the camera system 100*a* may include one or more flex circuits (e.g., including flex circuit 140*a*) that may be used to route/convey electrical signals between components of the camera system 100*a*. Such electrical signals may include, for example, image signals, power signals, and/or drive signals, etc. In some embodiments, electrical signals may be conveyed between one or more stationary components (e.g., external component(s) that are external to the camera system 100*a*) and the image sensor 104*a* via the flex circuit 140*a*. In some embodiments, the flex circuit(s) may also be used to convey electrical signals to the drive coils (e.g., AF coils 118*a* and OIS coils 128*a*).

According to various embodiments, the camera system 100*b* in FIG. 1B may include a lens group 102*b*, an image sensor 104*b*, and an actuator arrangement having an integrated architecture that enables OIS and lens shift AF. As will be discussed in further detail herein, the integrated architecture of the actuator arrangement of the camera system 100*b* may enable a reduction in size in multiple dimensions, e.g., as compared to the double module architecture of the actuator arrangement of the camera system 100*a* in FIG. 1A.

In some embodiments, the actuator arrangement of the camera system 100*b* may include one or more AF coils 106*b*, one or more OIS coils 108*b*, and one or more magnets (e.g., shared magnets 110*b*, as indicated in FIG. 1B). The shared magnets 110*b* may be considered "shared" in various embodiments because they can be used for both AF and OIS. For example, the shared magnets 110*b* may electromagnetically interact with the AF coils 106*b* to implement AF. Furthermore, the shared magnets 110*b* may electromagnetically interact with the OIS coils 108*b* to implement OIS.

According to some embodiments, the camera system 100*b* may include a first carrier 112*b*, a second carrier 114*b*, and a base structure 116*b*. The lens group 102*b* and the AF coils 106*b* may be fixedly coupled with the first carrier 112*b*, e.g., as indicated in FIG. 1B. The image sensor 104*b* and the shared magnets 110*b* may be fixedly coupled with the second carrier 114*b*, e.g., as indicated in FIG. 1B. The OIS coils 108*b* may be fixedly coupled with the base structure 116*b*, e.g., as indicated in FIG. 1B.

In various embodiments, a respective AF coil 106*b* may be located proximate a respective shared magnet 110*b* such that the respective AF coil 106*b*, when driven with an electric current, is capable of electromagnetically interacting with the respective shared magnet 110*b* to enable lens shift AF motion. For example, the lens shift AF motion may comprise movement of the first carrier 112*b* (and the lens group 102*b* coupled therewith), relative to the second carrier 114*b* (and the image sensor 104*b* coupled therewith), in at least one direction parallel to an optical axis 118*b* of the camera system 100*b*. In FIG. 1B, example direction(s) of the lens shift AF motion are indicated by double arrows 120*b*.

According to various embodiments, a respective OIS coil 108*b* may be located proximate a respective shared magnet 110*b* such that the respective OIS coil 108*b*, when driven with an electric current, is capable of electromagnetically interacting with the respective OIS coil 108*b* to enable OIS motion. As previously discussed, to enable the OIS motion, the lens group 102*b* and the image sensor 104*b* are rotated as a pair. In various embodiments, the OIS motion may comprise rotation of the first carrier 112*b* (and the lens group 102*b* coupled therewith) together with the second carrier 114*b* (and the image sensor 104*b* coupled therewith), relative to the base structure 116*b*, about multiple axes orthogonal to the optical axis 118*b*. For example, the first carrier 112*b* and the second carrier 114*b* may be rotated, relative to the base structure 116*b*, about a first axis orthogonal to the optical axis 118*b*. Furthermore, the first carrier 112*b* and the second carrier 114*b* may be rotated, relative to the base structure 116*b*, about a second axis orthogonal to the optical axis 118*b* and to the first axis. In FIG. 1B, arrows 120*b* and 122*b* are intended to generally represent rotational motion about each of two orthogonal axes, such as the first axis and the second axis.

In some embodiments, the camera system 100*b* may include a sensor package fixedly coupled with the second carrier 114*b*. For example, the sensor package may include the image sensor 104*b*, a substrate 124*b*, and/or an optical filter 126*b* (e.g., an infrared cut-off filter (IRCF)). As indicated in FIG. 1B, the image sensor 104*b* may be attached to the substrate 124*b*, and the substrate 124*b* may be attached to the second carrier 114*b*. The optical filter 126*b* may also be attached to the substrate 124*b* in some embodiments. The optical filter 126*b* may be positioned above the image sensor 104*b*, so that light passes through the optical filter 126*b* before it reaches the image sensor 104*b*.

According to some embodiments, the camera system 100*b* may include one or more flex circuits (e.g., including flex circuit 128*b*) that may be used to route/convey electrical signals between components of the camera system 100*b*.

Such electrical signals may include, for example, image signals, power signals, and/or drive signals, etc. In some embodiments, electrical signals may be conveyed between one or more stationary components (e.g., external component(s) that are external to the camera system 100*b*) and the image sensor 104*b* via the flex circuit 128*b*. In some embodiments, the flex circuit(s) may also be used to convey electrical signals to the drive coils (e.g., AF coils 106*b* and OIS coils 108*b*).

The camera system 100*b* may include a shield can 130*b* in various embodiments. The shield can 130*b* may encase at least a portion of the camera system 100*b*. For example, as indicated in FIG. 1B, the shield can 130*b* may be configured to encase an upper portion of the camera system 100*b* in some embodiments.

As compared to the double module architecture of the actuator arrangement of the camera system 100*a* in FIG. 1A, the integrated architecture of the actuator arrangement of the camera system 100*b* in FIG. 1B may enable a reduction in size in multiple dimensions. Take, for example, a Cartesian coordinate system in which the optical axis is the Z-axis, and a plane orthogonal to the optical axis is the XY-plane. As discussed herein, the double module architecture of camera 100*a* includes certain components and/or includes components arranged in a manner that may consume more space in the X, Y, and/or Z dimension(s), relative to the integrated architecture of camera system 100*b* in FIG. 1B.

For example, the double module architecture of camera 100*a* in FIG. 1A has two separate sets of actuator components—one set for AF motion and another set for OIS motion—and each set is within a respective module that is at least partially encased by a respective shield can. The double module architecture of camera system 100*a* in FIG. 1A includes redundant packaging of a flex circuit and an inner shield can. Due at least in part to the integrated architecture of camera system 100*b* in FIG. 1B not including such redundant packaging, the integrated architecture may allow for a size reduction relative to the double architecture.

As previously mentioned, the camera system 100*a* in FIG. 1A includes an inner shield can 110*a* that houses and/or at least partially encases the inner AF actuator, and also includes an outer shield can 112*a* that houses and/or at least partially encases the outer OIS actuator. The integrated architecture of camera system 100*b* in FIG. 1B, on the other hand, may not include an inner shield can like the one used in the double module architecture of camera system 100*a* in FIG. 1A, which may enable a size reduction in the X and/or Y dimensions. The flex circuit 140*a* of the camera system 100*a* in FIG. 1A may also consume more space in the X, Y, and/or Z dimensions, as compared to the space consumed by the flex circuit 128*b* of camera system 100*b* in FIG. 1B.

Furthermore, in the integrated architecture of camera system 100*b* in FIG. 1B, one or more components used for implementing AF may also be used for implementing OIS in some embodiments, whereas in the double module architecture of camera system 100*a* in FIG. 1A, the components used for implementing AF are separate from those used for implementing OIS. Additionally, or alternatively, in the integrated architecture of camera system 100*b* in FIG. 1B, one or more components used for implementing AF may be mounted on a same component (e.g., a same carrier/movable component, the base structure, etc.), whereas in the double architecture of camera system 100*a* in FIG. 1A, the components used for implementing AF are mounted on different components from those used for implementing OIS. The overlapping/integrated manner in which actuator components may be used in the integrated architecture of camera system 100*b* in FIG. 1B may allow for space savings in the X, Y, and/or Z dimension(s), as compared to the dual module architecture of camera system 100*a* in FIG. 1A.

According to various embodiments, the camera system 100*c* in FIG. 1C may include a lens group 102*c*, and image sensor 104*c*, and an actuator arrangement having an integrated architecture that enables OIS and sensor shift AF. As will be discussed in further detail herein, the integrated architecture of the actuator arrangement of the camera system 100*c* may enable a reduction in size in multiple dimensions, e.g., as compared to the double module architecture of the actuator arrangement of the camera system 100*a* in FIG. 1A.

In some embodiments, the actuator arrangement of the camera system 100*c* may include one or more AF coils 106*c*, one or more OIS coils 108*c*, and one or more magnets (e.g., shared magnets 110*c*, as indicated in FIG. 1C). The shared magnets 110*c* may be considered "shared" in various embodiments because they can be used for both AF and OIS. For example, the shared magnets 110*c* may electromagnetically interact with the AF coils 106*c* to implement AF. Furthermore, the shared magnets 110*c* may electromagnetically interact with the OIS coils 108*c* to implement OIS.

According to some embodiments, the camera system 100*c* may include a first carrier 112*c*, a second carrier 114*c*, and a base structure 116*c*. The image sensor 104*c* and the AF coils 106*c* may be fixedly coupled with the first carrier 112*c*, e.g., as indicated in FIG. 1C. The lens group 102*c* and the shared magnets 110*c* may be fixedly coupled with the second carrier 114*c*, e.g., as indicated in FIG. 1C. The OIS coils 108*c* may be fixedly coupled with the base structure 116*c*, e.g., as indicated in FIG. 1C.

In various embodiments, a respective AF coil 106*c* may be located proximate a respective shared magnet 110*c* such that the respective AF coil 106*c*, when driven with an electric current, is capable of electromagnetically interacting with the respective shared magnet 110*c* to enable sensor shift AF motion. For example, the sensor shift AF motion may comprise movement of the first carrier 112*c* (and the image sensor 104*c* coupled therewith), relative to the second carrier 114*c* (and the lens group 102*c* coupled therewith), in at least one direction parallel to an optical axis 118*c* of the camera system 100*c*. In FIG. 1C, example direction(s) of the sensor shift AF motion are indicated by double arrows 120*c*.

According to various embodiments, a respective OIS coil 108*c* may be located proximate a respective shared magnet 110*c* such that the respective OIS coil 108*c*, when driven with an electric current, is capable of electromagnetically interacting with the respective OIS coil 108*c* to enable OIS motion. As previously discussed, to enable the OIS motion, the lens group 102*c* and the image sensor 104*c* are rotated as a pair. In various embodiments, the OIS motion may comprise rotation of the first carrier 112*c* (and the image sensor 104*c* coupled therewith) together with the second carrier 114*c* (and the lens group 102*c* coupled therewith), relative to the base structure 116*c*, about multiple axes orthogonal to the optical axis 118*c*. For example, the first carrier 112*c* and the second carrier 114*c* may be rotated, relative to the base structure 116*c*, about a first axis orthogonal to the optical axis 118*c*. Furthermore, the first carrier 112*c* and the second carrier 114*c* may be rotated, relative to the base structure 116*c*, about a second axis orthogonal to the optical axis 118*c* and to the first axis. In FIG. 1C, arrows 120*c* and 122*c* are intended to generally represent rotational motion about each of two orthogonal axes, such as the first axis and the second axis.

In some embodiments, the camera system 100*c* may include a sensor package fixedly coupled with the first carrier 112*c*. For example, the sensor package may include the image sensor 104*c*, a substrate 124*c*, and/or an optical filter 126*c* (e.g., an infrared cut-off filter (IRCF)). As indicated in FIG. 1C, the image sensor 104*c* may be attached to the substrate 124*c*, and the substrate 124*c* may be attached to the first carrier 112*c*. The optical filter 126*c* may also be attached to the substrate 124*c* in some embodiments. The optical filter 126*c* may be positioned above the image sensor 104*c*, so that light passes through the optical filter 126*c* before it reaches the image sensor 104*c*.

According to some embodiments, the camera system 100*c* may include one or more flex circuits (e.g., including flex circuit 128*c*) that may be used to route/convey electrical signals between components of the camera system 100*c*. Such electrical signals may include, for example, image signals, power signals, and/or drive signals, etc. In some embodiments, electrical signals may be conveyed between one or more stationary components (e.g., external component(s) that are external to the camera system 100*c*) and the image sensor 104*c* via the flex circuit 128*c*. In some embodiments, the flex circuit(s) may also be used to convey electrical signals to the drive coils (e.g., AF coils 106*c* and OIS coils 108*c*).

The camera system 100*c* may include a shield can 130*c* in various embodiments. The shield can 130*c* may encase at least a portion of the camera system 100*c*. For example, as indicated in FIG. 1C, the shield can 130*c* may be configured to encase an upper portion of the camera system 100*c* in some embodiments.

As compared to the double module architecture of the actuator arrangement of the camera system 100*a* in FIG. 1A, the integrated architecture of the actuator arrangement of the camera system 100*c* in FIG. 1C may enable a reduction in size in multiple dimensions. As discussed herein, the double module architecture of camera 100*a* includes certain components and/or includes components arranged in a manner that may consume more space in the X, Y, and/or Z dimension(s), relative to the integrated architecture of camera system 100*c* in FIG. 1C.

For example, the double module architecture of camera 100*a* in FIG. 1A has two separate sets of actuator components—one set for AF motion and another set for OIS motion—and each set is within a respective module that is at least partially encased by a respective shield can. The double module architecture of camera system 100*a* in FIG. 1A includes redundant packaging of a flex circuit and an inner shield can. Due at least in part to the integrated architecture of camera system 100*c* in FIG. 1C not including such redundant packaging, the integrated architecture may allow for a size reduction relative to the double architecture.

As previously mentioned, the camera system 100*a* in FIG. 1A includes an inner shield can 110*a* that houses and/or at least partially encases the inner AF actuator, and also includes an outer shield can 112*a* that houses and/or at least partially encases the outer OIS actuator. The integrated architecture of camera system 100*c* in FIG. 1C, on the other hand, may not include an inner shield can like the one used in the double module architecture of camera system 100*a* in FIG. 1A, which may enable a size reduction in the X and/or Y dimensions. The flex circuit 140*a* of the camera system 100*a* in FIG. 1A may also consume more space in the X, Y, and/or Z dimensions, as compared to the space consumed by the flex circuit 128*c* of camera system 100*c* in FIG. 1C.

Furthermore, in the integrated architecture of camera system 100*c* in FIG. 1C, one or more components used for implementing AF may also be used for implementing OIS in some embodiments, whereas in the double module architecture of camera system 100*a* in FIG. 1A, the components used for implementing AF are separate from those used for implementing OIS. Additionally, or alternatively, in the integrated architecture of camera system 100*c* in FIG. 1C, one or more components used for implementing AF may be mounted on a same component (e.g., a same carrier/movable component, the base structure, etc.), whereas in the double architecture of camera system 100*a* in FIG. 1A, the components used for implementing AF are mounted on different components from those used for implementing OIS. The overlapping/integrated manner in which actuator components may be used in the integrated architecture of camera system 100*c* in FIG. 1C may allow for space savings in the X, Y, and/or Z dimension(s), as compared to the dual module architecture of camera system 100*a* in FIG. 1A.

Figure 2A:
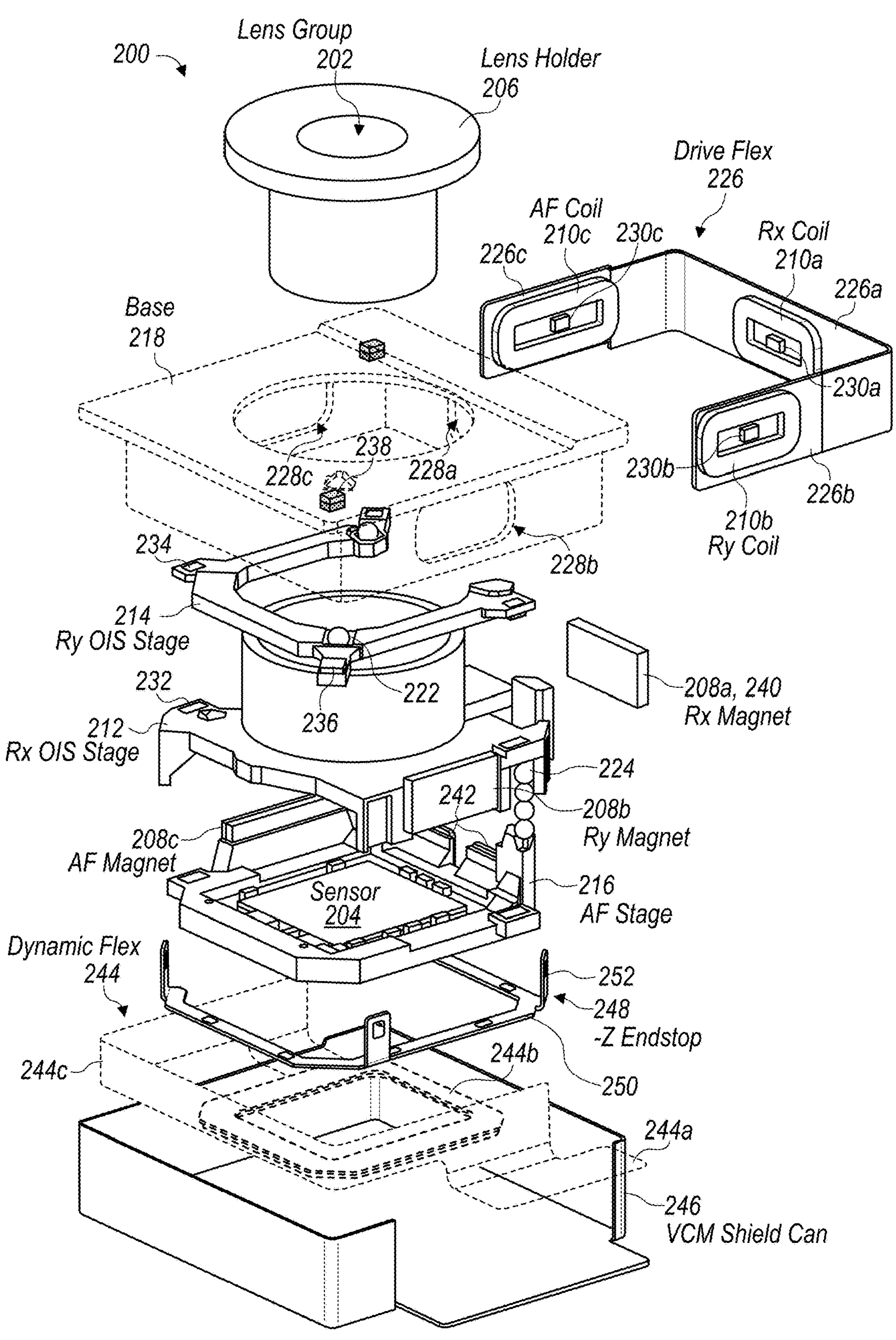
FIGS. 2A-2C illustrate views of an example camera system that includes an actuator arrangement for rotating a lens group and an image sensor to provide OIS, in accordance with some embodiments.
Figure 2B:
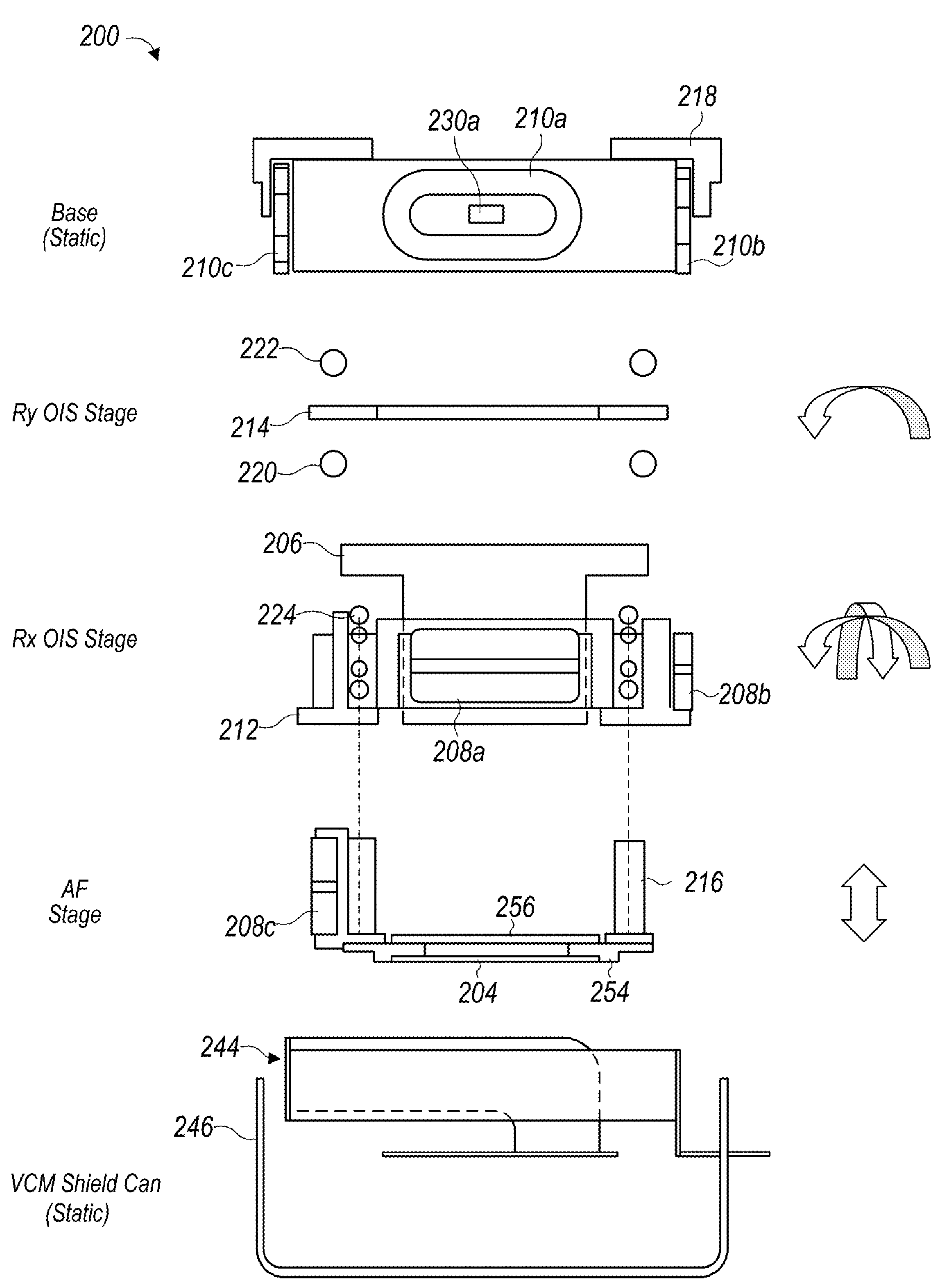
Figure 2C:
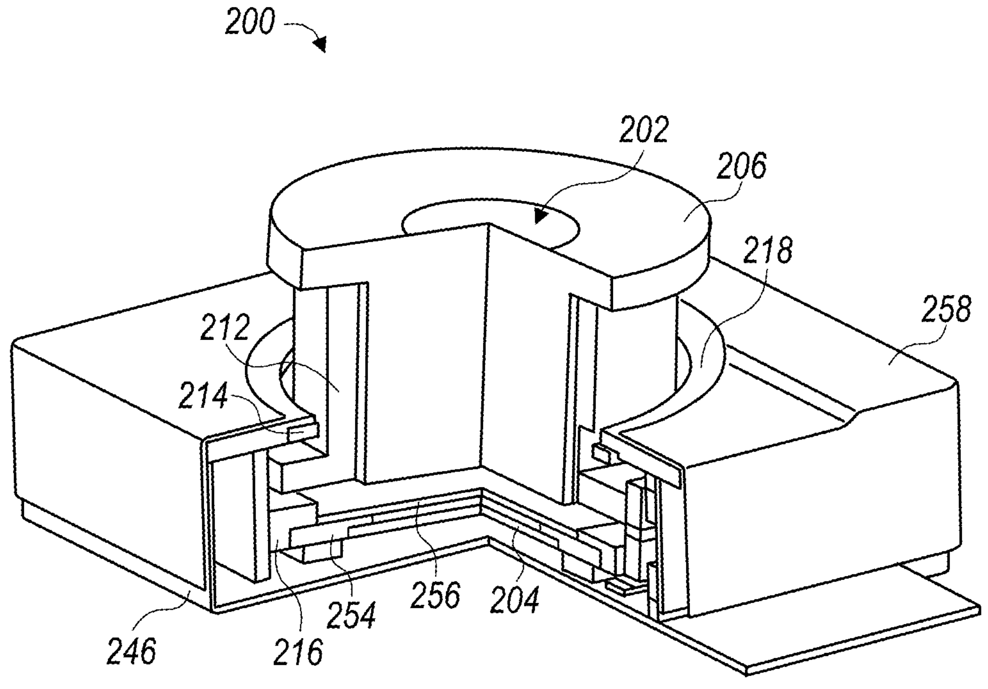

FIGS. 2A-2C illustrate views of an example camera system 200 that includes an actuator arrangement for rotating a lens group 202 and an image sensor 204 to provide OIS, in accordance with some embodiments. FIG. 2A shows an exploded perspective view of the camera system 200. FIG. 2B shows an exploded side cross-sectional view of the camera system 200. FIG. 2C shows a perspective partial cross-sectional view of the camera system 200.

In various embodiments, the camera system 200 may include the lens group 202, the image sensor 204, one or more actuators (e.g., voice coil motor (VCM) actuator(s)), and/or a suspension arrangement (e.g., a ball bearing suspension arrangement). As will be discussed in greater detail herein, the actuator(s) may include an actuator arrangement for rotating the lens group 202, together with the image sensor 204, to provide OIS. Furthermore, the actuator(s) may include an actuator arrangement for shifting the image sensor 204, relative to the lens group 202, to provide autofocus (AF).

According to various embodiments, the lens group 202 may include one or more lens elements. The lens element(s) may define an optical axis (e.g., optical axis 122*a* in FIG. 1A, optical axis 118*b* in FIG. 1B, and/or optical axis 118*c* in FIG. 1C, etc.) of the camera system 200. Additionally, or alternatively, the image sensor 204 may define an optical axis of the camera system 200. For example, the optical axis may be an axis that is orthogonal to a light-receiving surface of the image sensor 204. In some embodiments, the lens group 202 may be contained within a lens holder 206 (e.g., a lens barrel), e.g., as indicated in FIG. 2A.

As previously mentioned, the actuator(s) may include VCM actuator(s) in some embodiments. The VCM actuator(s) shown in FIGS. 2A-2B may include drive magnets 208 (e.g., one or more OIS drive magnets and/or one or more AF drive magnets) and drive coils 210 (e.g., one or more OIS drive coils and/or one or more AF drive coils). In some embodiments, the OIS drive magnet(s) may include a first drive magnet 208*a* (also referred to herein as an "Rx magnet") and a second drive magnet 208*b* (also referred to herein as an "Ry magnet"). The AF drive magnet(s) may include an AF drive magnet 208*c*. According to some embodiments, the OIS drive coil(s) may include a first drive coil 210*a* (also referred to herein as an "Rx coil") and a second drive coil 210*b* (also referred to herein as an "Ry coil"). The AF drive coil(s) may include an AF drive coil 210*c*.

In some embodiments, a respective drive coil 210 may be positioned proximate a respective drive magnet 208, e.g., such that the respective drive coil 210, when driven with an electric current, is capable of electromagnetically interacting with the respective drive magnet 208 to enable OIS motion and/or AF motion. For example, as indicated in FIG. 2A, the Rx coil 210*a* may be located near the Rx magnet 208*a*. The Ry coil 210*b* may be located near the Ry magnet 208*b*. The AF coil 210*c* may be located near the AF magnet 208*c*.

According to various embodiments, the suspension arrangement may be configured to suspend the lens group 202 and the image sensor 204. Furthermore, the suspension arrangement may be configured to allow motion (e.g., OIS motion and/or AF motion, as described herein) enabled by the actuator(s). As previously mentioned, the suspension arrangement may include a ball bearing suspension arrangement in some embodiments. The ball bearing suspension arrangement shown in FIGS. 2A-2C may comprise multiple stages that move on ball bearings. As will be discussed in greater detail herein, the stages may include a first movable component coupled with the lens group 202, and a second movable component coupled with the image sensor 204. The first movable component and the second movable component may additionally or alternatively be referred to as "carriers" in various embodiments.

In some embodiments, the multiple stages of the ball bearing suspension arrangement may include a first OIS stage 212 (also referred to herein as an "Rx OIS stage"), a second OIS stage 214 (also referred to herein as an "Ry OIS stage"), and an AF stage 216. Furthermore, the camera system 200 and/or the ball bearing suspension arrangement may include a base structure 218. As indicated in FIG. 2A, the lens group 202 may be fixedly coupled with the Rx OIS stage 212, and the image sensor 204 may be fixedly coupled with the AF stage 216.

The Rx OIS stage 212 may be capable of pivoting on a first set of ball bearings 220 (see FIG. 2B) disposed between the Rx OIS stage 212 and the Ry OIS stage 214, e.g., so as to rotate the Rx OIS stage 212, together with the Ry OIS stage 214, about a first axis (e.g., axis 516 in FIG. 5) orthogonal to the optical axis. The Ry OIS stage 214 may be capable of pivoting on a second set of ball bearings 222 disposed between the Ry OIS stage 214 and the base structure 218, e.g., so as to rotate the Ry OIS stage 214, together with the Rx OIS stage 212 and the AF stage 216, relative to the base structure 218, about a second axis (e.g., axis 522 in FIG. 5) orthogonal to the optical axis and orthogonal to the first axis. The AF stage 216 may be capable of moving on a third set of ball bearings 224 disposed between the AF stage 216 and the Rx OIS stage 212, e.g., so as to shift the AF stage 216, relative to the Rx OIS stage 212, in at least one direction parallel to the optical axis (e.g., a Z-axis direction).

According to some embodiments, the Rx coil 210*a*, the Ry coil 210*b*, and the AF coil 210*c* may be fixedly coupled with the base structure 218, e.g., as indicated in FIG. 2A. According to some embodiments, the camera system 200 may include a drive flex circuit 226 with which the drive coils 210 may be attached or otherwise fixedly coupled. A driver (not shown) for driving the drive coils 210 may also be coupled with the drive flex circuit 226. In some embodiments, the drive flex circuit 226 may be folded, e.g., such that it can wrap around at least a portion of the base structure 218. For example, the drive flex circuit 226 may include a first portion 226*a*, a second portion 226*b*, and a third portion 226*c* in some embodiments. The drive flex circuit 226 may include a fold between the first portion 226*a* and the second portion 226*b*, and another fold between the first portion 226*a* and the third portion 226*c*. Accordingly, in some embodiments the drive flex circuit 226 may generally be U-shaped.

In some embodiments, the Rx coil 210*a* may be disposed at a first side of the base structure 218. For example, the Rx coil 210*a* may be coupled with the drive flex circuit 226 at the first portion 226*a*, e.g., as indicated in FIG. 2A, and the first portion 226*a* may be positioned adjacent the first side of the base structure 218. According to some embodiments, the first side of the base structure 218 may define a first aperture 228*a* at which the Rx coil 210*a* may be received, e.g., so as to expose the Rx coil 210*a* to an interior of the base structure 218.

In some embodiments, the Ry coil 210*b* may be disposed at a second side of the base structure 218. For example, Ry coil 210*b* may be coupled with the drive flex circuit 226 at the second portion 226*b*, e.g., as indicated in FIG. 2A, and the second portion 226*b* may be positioned adjacent the second side of the base structure 218. According to some embodiments, the second side of the base structure 218 may define a second aperture 228*b* at which the Ry coil 210*b* may be received, e.g., so as to expose the Ry coil 210*b* to the interior of the base structure 218.

In some embodiments, the AF coil 210*c* may be disposed at a third side of the base structure 218. The third side may be opposite the first side relative to the lens group 202. According to some embodiments, the AF coil 210*c* may be coupled with the drive flex circuit 226 at the third portion 226*c*, e.g., as indicated in FIG. 2A, and the third portion 226*c* may be positioned adjacent the third side of the base structure 218. According to some embodiments, the third side of the base structure 218 may define a third aperture 228*c* at which the AF coil 210*c* may be received, e.g., so as to expose the AF coil 210*c* to the interior of the base structure 218.

According to some embodiments, the Rx magnet 208*a* and the Ry magnet 208*b* may be fixedly coupled with the Rx OIS stage 212. For example, the Rx magnet 208*a* may be fixedly coupled with the Rx OIS stage 212 at a first side of the Rx OIS stage 212 (e.g., generally corresponding to a first side of the camera system 200 and/or facing the first side of the base structure 218 in some embodiments). The Ry magnet 208*b* may be fixedly coupled with the Rx OIS stage 212 at a second side of the Rx OIS stage 212 (e.g., generally corresponding to a second side of the camera system 200 and/or facing the second side of the base structure 218 in some embodiments).

In some embodiments, the AF magnet 208*c* may be fixedly coupled with the AF stage 216. For example, the AF magnet 208*c* may be fixedly coupled with the AF stage 216 at a side of the AF stage 216 that generally corresponds to a third side of the camera system 200 and/or that faces the third side of the base structure 218 in some embodiments.

In some embodiments, Rx OIS stage 212 and AF stage 216 may each be mirror-flipped across their centerline as compared to the embodiment illustrated in FIG. 2B. For example, Ry magnet 208*b* and AF magnet 208*c* are on opposite sides of the camera module 200. In a mirror-flipped embodiment, the relative positions of Ry magnet 208*b* and AF magnet 208*c* are reversed compared to the embodiment illustrated in FIG. 2B. In such a mirror-flipped embodiment, the positions of Ry coil 210*b* and AF coil 210*c* would also be reversed from what is illustrated in FIG. 2A. Given the location of dynamic flex 244, the mirror-flipped embodiment may allow for room for a larger AF magnet 208*c* without increasing the overall size of camera module 200.

According to various embodiments, to enable OIS motion, the camera system 200 may be configured to drive the Rx coil 210*a* and/or the Ry coil 210*b* with electric current. When driven with an electric current, the Rx coil

210*a* may electromagnetically interact with the Rx magnet 208*a* to produce a Lorentz force that rotates the Rx OIS stage 212 (and the lens group 202 coupled therewith), together with the AF stage 216 (and the image sensor 204 coupled therewith), about a first axis (e.g., axis 516 in FIG. 5) orthogonal to the optical axis. When driven with an electric current, the Ry coil 210*b* may electromagnetically interact with the Ry magnet 208*b* to produce a Lorentz force that rotates the Ry OIS stage 214 and the Rx OIS stage 212 (and the lens group 202 coupled therewith), together with the AF stage 216 (and the image sensor 204 coupled therewith), about a second axis (e.g., axis 522 in FIG. 5) orthogonal to the optical axis and orthogonal to the first axis.

In some embodiments, the Rx coil 210*a* and the Ry coil 210*b* may be driven in the same direction to cause rotation of the lens group 202, together with the image sensor 204, about the first axis. Furthermore, the Rx coil 210*a* and the Ry coil 210*b* may be driven in different directions to cause rotation of the lens group 202, together with the image sensor 204, about the second axis.

According to various embodiments, to enable AF motion, the camera system 200 may be configured to drive the AF coil 210*c* with electric current. When driven with an electric current, the AF coil 210*c* may electromagnetically interact with the AF magnet 208*c* to produce a Lorentz force that shifts/translates the AF stage 216 (and the image sensor 204 coupled therewith), relative to the Rx OIS stage 212 (and the lens group 202 coupled therewith), in at least one direction parallel to the optical axis.

In some embodiments, the camera system 200 may include position sensors 230 that may be used to detect a current position of one or more components of the camera system 200. The position sensors 230 may include an Rx position sensor 230*a*, an Ry position sensor 230*b*, and/or an AF position sensor 230*c*. According to some embodiments, one or more of the position sensors 230 may be encircled by a drive coil 210. As indicated in FIG. 2A, for example, the Rx position sensor 230*a* may be encircled by the Rx coil 210*a*. Additionally, or alternatively, the Ry position sensor 230*b* may be encircled by the Ry coil 210*b*. Additionally, or alternatively, the AF position sensor 230*c* may be encircled by the AF coil 210*c*. Aspects of the VCM actuator(s) and the position sensors 230 are also discussed herein with reference to FIG. 4.

According to some embodiments, the camera system 200 may include a magnetic preload arrangement for preloading the ball bearings in the ball bearing suspension arrangement. For example, the magnetic preload arrangement may include a first set of preload magnetic elements for preloading the first set of ball bearings 220, a second set of preload magnetic elements for preloading the second set of ball bearings 222, and/or a third set of preload magnetic elements for preloading the third set of ball bearings 224. As used herein, the term "preload magnetic element" may refer to a magnetic component (e.g., comprising a magnet) and/or a ferromagnetic component (e.g., a ferromagnetic plate).

The first set of preload magnetic elements may include a first magnetic element 232 and a second magnetic element 234. The first magnetic element 232 may be coupled with the Rx OIS stage 212. The second magnetic element 234 may be coupled with the Ry OIS stage 214. Furthermore, the second magnetic element 234 may be positioned proximate the first magnetic element 232, e.g., such that the first magnetic element 232 and the second magnetic element 234 magnetically interact with each other to provide a force that attracts the Rx OIS stage 212 and the Ry OIS stage 214 to each other.

The second set of preload magnetic elements may include a third magnetic element 236 and a fourth magnetic element 238. The third magnetic element 236 may be coupled with the Ry OIS stage 214. The fourth magnetic element 238 may be coupled with the base structure 218. Furthermore, the fourth magnetic element 238 may be positioned proximate the third magnetic element 236, e.g., such that the third magnetic element 236 and the fourth magnetic element 238 magnetically interact with each other to provide a force that attracts the Ry OIS stage 214 and the base structure 218 to each other.

The third set of preload magnetic elements may include a fifth magnetic element 240 and a sixth magnetic element 242. The fifth magnetic element 240 may be coupled with the Rx OIS stage 212. The sixth magnetic element 242 may be coupled with the AF stage 216. Furthermore, the sixth magnetic element 242 may be positioned proximate the fifth magnetic element 240, e.g., such that the fifth magnetic element 240 and the sixth magnetic element 242 magnetically interact with each other to provide a force that attracts the Rx OIS stage 212 and the AF stage 216 to each other.

In some embodiments, the camera system 200 may include a dynamic flex circuit 244 that may be used to route/convey electrical signals between components of the camera system 200. Such electrical signals may include, for example, image signals, power signals, and/or drive signals, etc. In some embodiments, electrical signals may be conveyed between one or more stationary components (e.g., external component(s) that are external to the camera system 200) and the movable image sensor 204 via the dynamic flex circuit 244.

According to some embodiments, the dynamic flex circuit 244 may generally include a first portion 244*a*, a second portion 244*b*, and/or a third portion 244*c*, e.g., as indicated in FIG. 2A. The first portion 244*a* of the dynamic flex circuit 244 may be coupled with one or more stationary components of the camera system 200. For example, the first portion 244*a* may be attached to a voice coil motor (VCM) shield can 246. The VCM shield can 246 may be configured to encase at least a portion of the camera system 200 and/or the VCM actuator(s). The second portion 244*b* of the dynamic flex circuit 244 may be coupled with the image sensor 204 (and/or an image sensor package that includes the image sensor 204). The third portion 244*c* of the dynamic flex circuit 244 may extend from the first portion 244*a* to the second portion 244*b*. The third portion 244*c* may be configured to provide sufficient service loop and/or compliance so as to allow motion of the image sensor 204 enabled by the VCM actuator(s), while being capable of routing/conveying electrical signals between the first portion 244*a* and the second portion 244*b*.

In some embodiments, the dynamic flex circuit 244 may be coupled with the drive flex circuit 226, e.g., directly (e.g., via conductive bonding), via a portion of flex circuit (extending from the dynamic flex circuit 244 to the drive flex circuit 226), and/or indirectly via one or more conductive components of the camera system 200 suitable for routing electrical signals between the dynamic flex circuit 244 and the drive flex circuit 226.

According to various embodiments, the camera system 200 may include a shield can 246 (e.g., VCM shield can 246) that encases at least a portion of the camera system 200. Among other things, the VCM shield can 246 may encase at least a portion of the VCM actuator(s) of the camera system 200 in some embodiments, e.g., as indicated in FIGS. 2A-2B.

The camera system 200 may include one or more endstops in some embodiments. For example, as indicated in FIG. 2A, the camera system 200 may include a −Z endstop 248 configured to provide a lowermost position that the AF stage 216 may reach, e.g., in a direction parallel to the optical axis (e.g., in a downward direction, which may also be considered a "−Z" direction). In some embodiments, the −Z endstop 248 may include a base portion 250 and/or one or more attachment portions 252. As indicated in FIG. 2A, the base portion 250 may include an endstop surface (e.g., the uppermost surface of the base portion 250), a portion of which may engage the AF stage 216 at the predetermined lowermost position, so as to prevent the AF stage 216 from moving, in the −Z direction, past the endstop surface of the base portion 250. In some embodiments, the attachment portion(s) 252 may include protrusions (e.g., upward protrusions) that are configured to be attached to the Rx OIS stage 212. As a non-limiting example, the attachment portions 252 shown in FIG. 2A may define recesses and/or cutouts which may be used to clip the −Z endstop 248 to corresponding clipping portion of the Rx OIS stage 212.

While FIG. 2A indicates that the image sensor 204 is coupled with the AF stage 216, FIGS. 2B-2C indicate example components that may be included in a sensor package coupled with the AF stage 216. In various embodiments, the sensor package may include the image sensor 204, a substrate 254, and/or an optical filter 256 (e.g., an infrared cut-off filter (IRCF)). As indicated in FIGS. 2B-2C, the image sensor 204 may be attached to the substrate 254, and the substrate 254 may be attached to the AF stage 216. The optical filter 256 may also be attached to the substrate 254 in some embodiments. The optical filter 256 may be positioned above the image sensor 204, so that light passes through the optical filter 256 before it reaches the image sensor 204.

As indicated in FIG. 2C, the camera system 200 may include an upper shield can 258 in some embodiments. The upper shield can 258 may encase at least a portion of the camera system 200. For example, the upper shield can 258 may be configured to wrap around at least a portion of the base structure 218. Additionally, or alternatively, the upper shield can 258 may encase an upper portion of the camera system 200 and/or at least partially overlap with the VCM shield can 246, which may encase a lower portion of the camera system 200 in some embodiments.

Figure 3:
FIG. 3 shows an exploded perspective view of an example magnetic preload arrangement of a camera system, in accordance with some embodiments.
Figure 3:
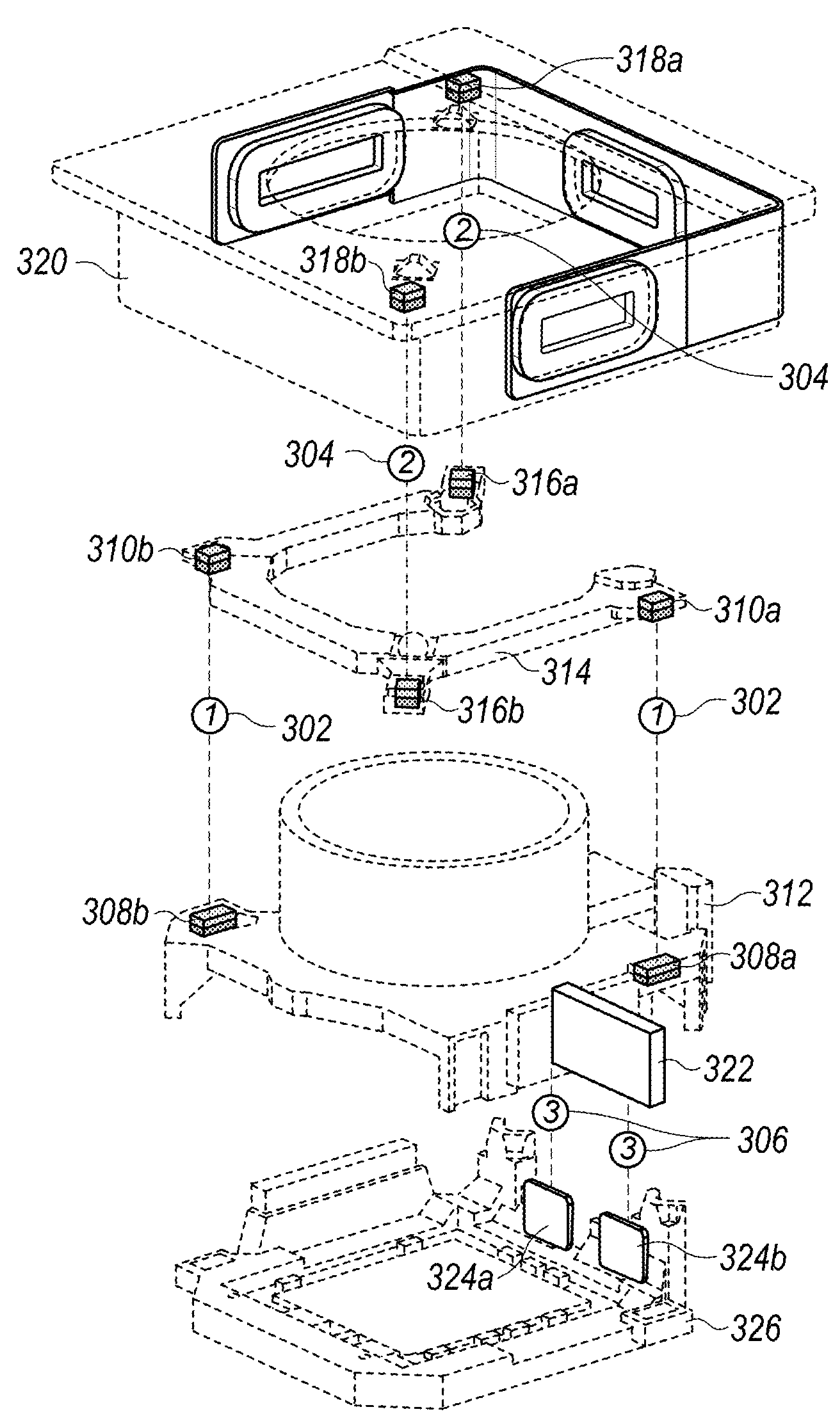
Figure 3:
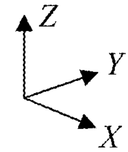

FIG. 3 shows an exploded perspective view of an example magnetic preload arrangement 300 of a camera system (e.g., similar to, or the same as, camera system 200 in FIG. 2 and/or one or more other camera systems disclosed herein, etc.), in accordance with some embodiments. In various embodiments, the magnetic preload arrangement 300 may include a first set of preload magnetic elements 302, a second set of preload magnetic elements 304, and/or a third set of preload magnetic elements 306.

In some embodiments, the first set of preload magnetic elements 302 may include one or more first magnetic elements 308 (e.g., including first magnetic element 308*a* and/or first magnetic element 308*b*, etc.) and one or more second magnetic elements 310 (e.g., including second magnetic element 310*a* and/or second magnetic element 310*b*, etc.). The first magnetic element(s) 308 may be coupled with the Rx OIS stage 312. The second magnetic elements 310 may be coupled with the Ry OIS stage 314.

According to some embodiments, the second set of preload magnetic elements 304 may include one or more third magnetic elements 316 (e.g., including third magnetic element 316*a* and/or third magnetic element 316*b*, etc.) and one or more fourth magnetic elements 318 (e.g., including fourth magnetic element 318*a* and/or fourth magnetic element 318*b*, etc.). The third magnetic element(s) 316 may be coupled with the Ry OIS stage 314. The fourth magnetic element(s) 318 may be coupled with the base structure 320.

In some embodiments, the third set of preload magnetic elements 306 may include one or more fifth magnetic elements (e.g., fifth magnetic element 322) and one or more sixth magnetic elements 324 (e.g., sixth magnetic element 324*a* and/or sixth magnetic element 324*b*, etc.). The fifth magnetic element(s) may be coupled with the Rx OIS stage 312. The sixth magnetic element(s) may be coupled with the AF stage 326.

Figure 4:
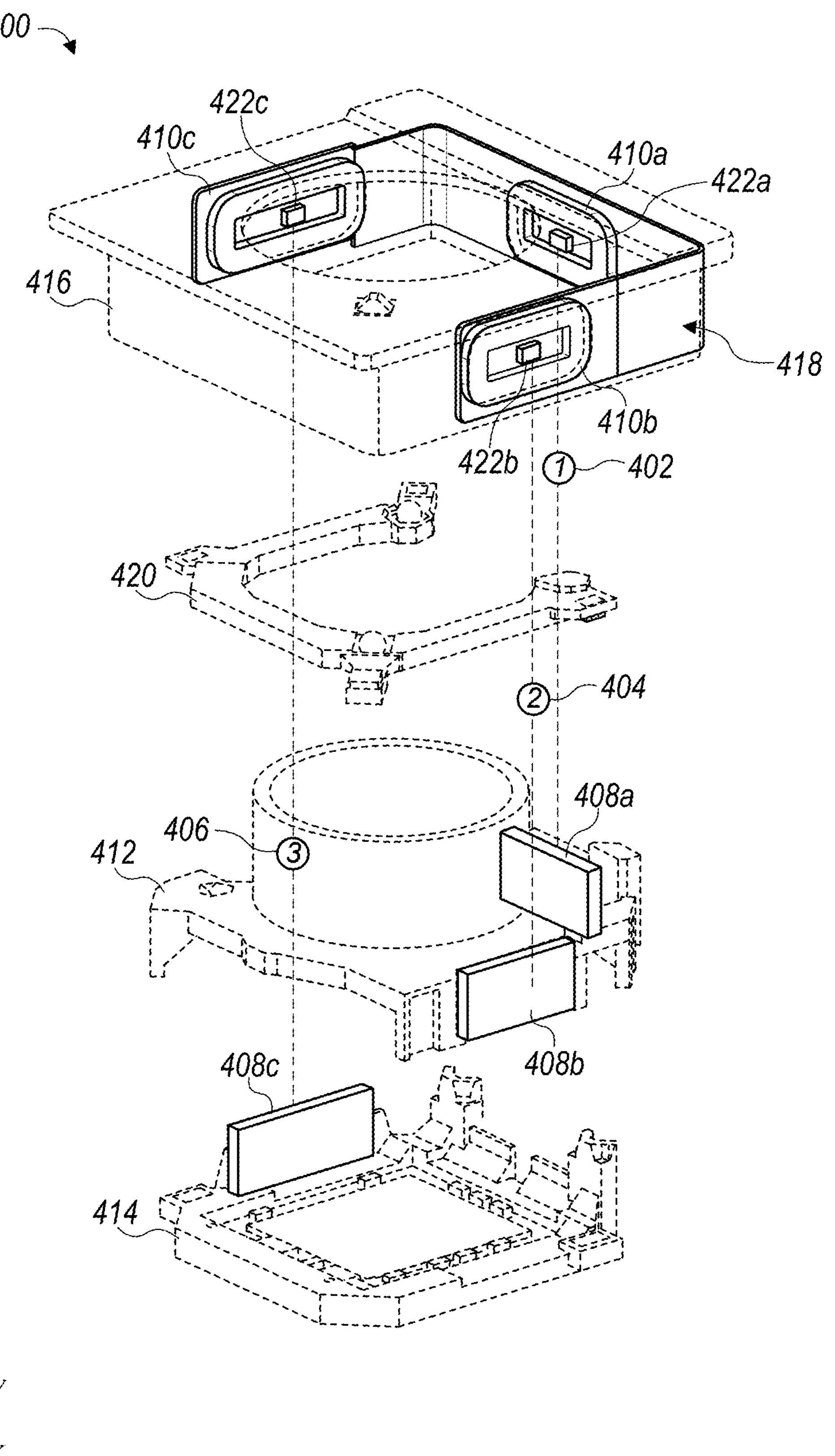
FIG. 4 shows an exploded perspective view of an example actuator arrangement of a camera system, in accordance with some embodiments.

FIG. 4 shows an exploded perspective view of an example voice coil motor (VCM) actuator arrangement 400 of a camera system (e.g., similar to, or the same as, camera system 200 in FIG. 2 and/or one or more other camera systems disclosed herein, etc.), in accordance with some embodiments. In various embodiments, the VCM actuator arrangement 400 may include a first drive magnet-coil pair (e.g., Rx OIS drive magnet-coil pair 402), a second drive magnet-coil pair (e.g., Ry OIS drive magnet-coil pair 404), and/or a third drive magnet-coil pair (e.g., AF drive magnet-coil pair 406).

In some embodiments, the Rx OIS drive magnet-coil pair 402 may include a first OIS magnet 408*a* and a first OIS coil 410*a* positioned near one another. The Ry OIS drive magnet-coil pair 404 may include a second OIS magnet 408*b* and a second OIS coil 410*b* positioned near one another. The AF drive magnet-coil pair 406 may include an AF magnet 408*c* and an AF coil 410*c* positioned near one another.

According to some embodiments, the first OIS magnet 408*a* and the second OIS magnet 408*b* may be fixedly coupled with the Rx OIS stage 412. The AF OIS magnet 408*c* may be fixedly coupled with the AF stage 414. In some embodiments, the first OIS coil 410*a*, the second OIS coil 410*b*, and the AF coil 410*c* may be coupled with the base structure 416. For example, the first coil 410*a*, the second OIS coil 410*b*, and the AF coil 410*c* may be coupled with the drive flex circuit 418.

The first OIS coil 410*a* may be positioned proximate the first OIS magnet 408*a* such that the first OIS coil 410*a*, when driven with an electric current, is capable of electromagnetically interacting with the first OIS magnet 408*a* to enable Rx OIS motion and/or Ry OIS motion. The second OIS coil 410*b* may be positioned proximate the second OIS magnet 408*b* such that the second OIS coil 410*b*, when driven with an electric current, is capable of electromagnetically interacting with the second OIS magnet 408*b* to enable Rx OIS motion and/or Ry OIS motion. In various embodiments, the Rx OIS motion may comprise rotation of the lens group (e.g., lens group 202 in FIG. 2 and/or one or more other lens groups disclosed herein, etc.), together with the image sensor (e.g., image sensor 204 in FIG. 2 and/or one or more other image sensors disclosed herein, etc.), relative to the base structure 416, about a first axis (e.g., axis 516 in FIG. 5) orthogonal to an optical axis of the camera system. The Ry OIS motion may comprise rotation of the lens group, together with the image sensor, relative to the base structure 416, about a second axis (e.g., axis 522 in FIG. 5) orthogonal to the optical axis.

As previously mentioned, the camera system may include a ball bearing suspension arrangement, which may include the Rx OIS stage 412, the Ry OIS stage 420, and the AF stage 414 in some embodiments. Aspects of an example ball bearing suspension arrangement are discussed in further detail herein with reference to FIG. 5.

In various embodiments, the camera system may include one or more position sensors 422. For example, the position sensor(s) 422 may include an Rx OIS position sensor 422*a*, an Ry OIS position sensor 422*b*, and/or an AF position sensor 422*c*. The Rx OIS position sensor 422*a* may be coupled with the drive flex circuit 418. Furthermore, the Rx OIS position sensor 422*a* may be encircled by the Rx OIS coil 410*a* in some embodiments. The Ry OIS position sensor 422*b* may be coupled with the drive flex circuit 418. Furthermore, the Ry OIS position sensor 422*b* may be encircled by the Ry OIS coil 410*b* in some embodiments. The Rx OIS position sensor 422*a* and/or the Ry OIS position sensor 422*b* may be used to determine a current position of one or more movable components (e.g., the lens group and/or the image sensor, etc.) with respect to rotation about the first axis orthogonal to the optical axis and/or with respect to rotation about the second axis orthogonal to the optical axis and orthogonal to the first axis.

The AF position sensor 422*c* may be coupled with the drive flex circuit 418. Furthermore, the AF position sensor 422*c* may be encircled by the AF coil 410*c* in some embodiments. The AF position sensor 422*c* may be used to determine a current position of one or more movable components (e.g., the image sensor) with respect to at least one direction parallel to the optical axis.

Figure 5:
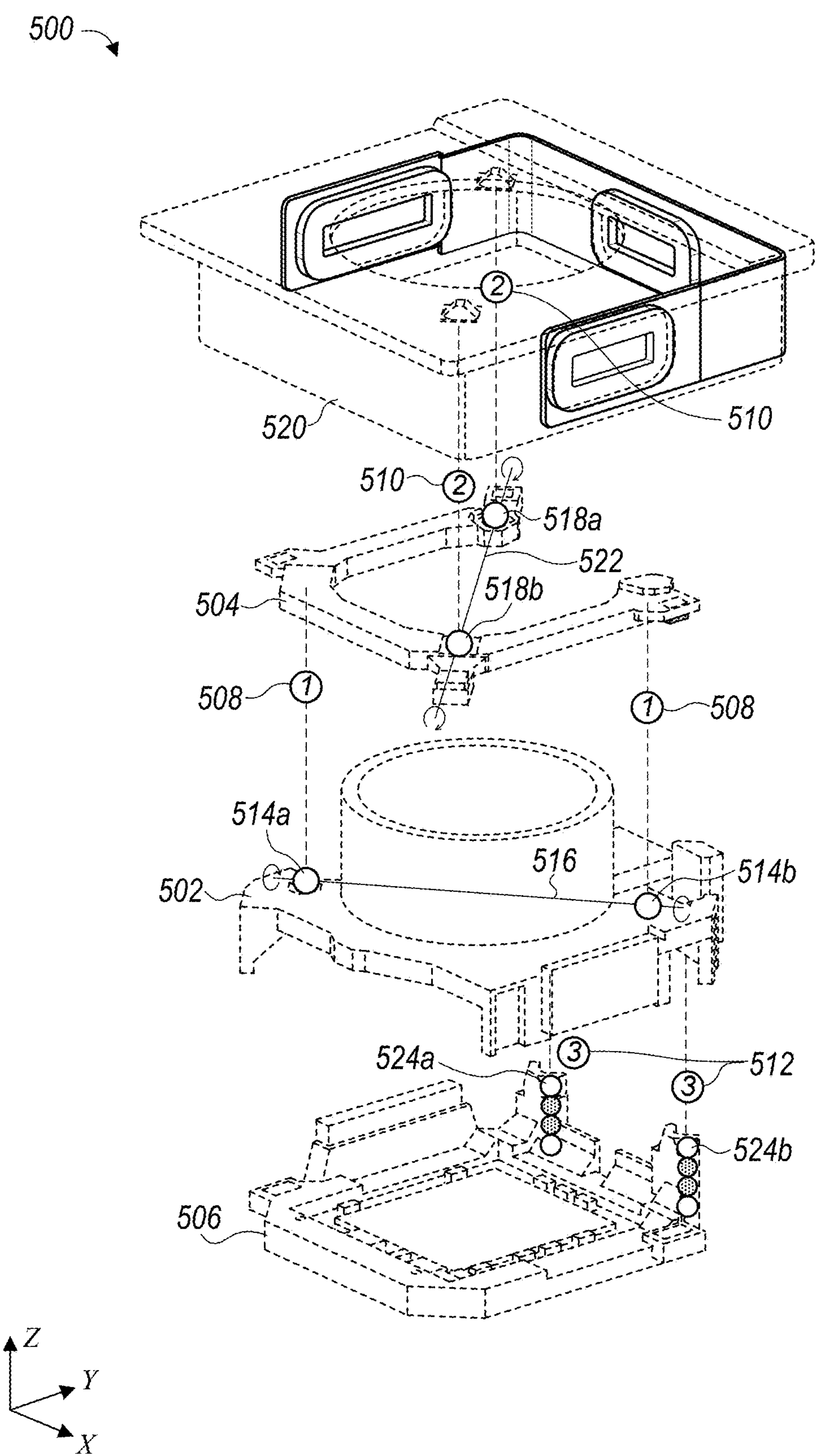
FIG. 5 shows an exploded perspective view of an example ball bearing suspension arrangement of a camera system, in accordance with some embodiments.

FIG. 5 shows an exploded perspective view of an example ball bearing suspension arrangement 500 of a camera system (e.g., similar to, or the same as, camera system 200 in FIG. 2 and/or one or more other camera systems disclosed herein, etc.), in accordance with some embodiments. In various embodiments, the ball bearing suspension arrangement may include an Rx OIS stage 502, an Ry OIS stage 504, and/or an AF stage 506. Furthermore, the ball bearing suspension arrangement 500 may include a first ball bearing arrangement 508, a second ball bearing arrangement 510, and/or a third ball bearing arrangement 512.

The first ball bearing arrangement 508 may include a first set of ball bearings 514. The first set of ball bearings 514 may include, for example, a first ball bearing 514*a* and/or a second ball bearing 514*b*, etc. The first set of ball bearings 514 may be disposed between the Rx OIS stage 502 and the Ry OIS stage 504. The Rx OIS stage 502 may be capable of pivoting on the first set of ball bearings 514, so as to rotate the Rx OIS stage 502 about a first axis 516 orthogonal to an optical axis of the camera system, e.g., as indicated in FIG. 5. Example ball bearing engagement locations, at which the first set of ball bearings 514 may engage the Rx OIS stage 502 and the Ry OIS stage 504, may be indicated, generally, by the endpoints of the vertical dashed lines associated with the first ball bearing arrangement 508.

The second ball bearing arrangement 510 may include a second set of ball bearings 518. The second set of ball bearings 518 may include, for example, a third ball bearing 518*a* and/or a fourth ball bearing 518*b*, etc. The second set of ball bearings 518 may be disposed between the Ry OIS stage 504 and a base structure 520 (which may also be considered part of the ball bearing suspension arrangement 500 in various embodiments). The Ry OIS stage 504 may be capable of pivoting on the second set of ball bearings 518, so as to rotate the Ry OIS stage 504 about a second axis 522 orthogonal to the optical axis, e.g., as indicated in FIG. 5. Example ball bearing engagement locations, at which the second set of ball bearings 518 may engage the Ry OIS stage 504 and the base structure 520, may be indicated, generally, by the endpoints of the vertical dashed lines associated with the second ball bearing arrangement 510.

The third ball bearing arrangement 512 may include a third set of ball bearings 524. The third set of ball bearings 524 may include, for example, fifth ball bearing(s) 524*a* and/or sixth ball bearing(s) 524*b*, etc. The third set of ball bearings 524 may be disposed between the AF stage 506 and the Rx OIS stage 502. The AF stage 506 may be capable of moving on the third set of ball bearings 524, so as to shift/translate the AF stage 506, relative to the Rx OIS stage 502, in at least one direction parallel to the optical axis, e.g., as indicated in FIG. 5. Example ball bearing engagement locations, at which the third set of ball bearings 524 may engage the AF stage 506 and the Rx OIS stage 502, may be indicated, generally, by the endpoints/end portions of the vertical dashed lines associated with the third ball bearing arrangement 512.

Figure 6:
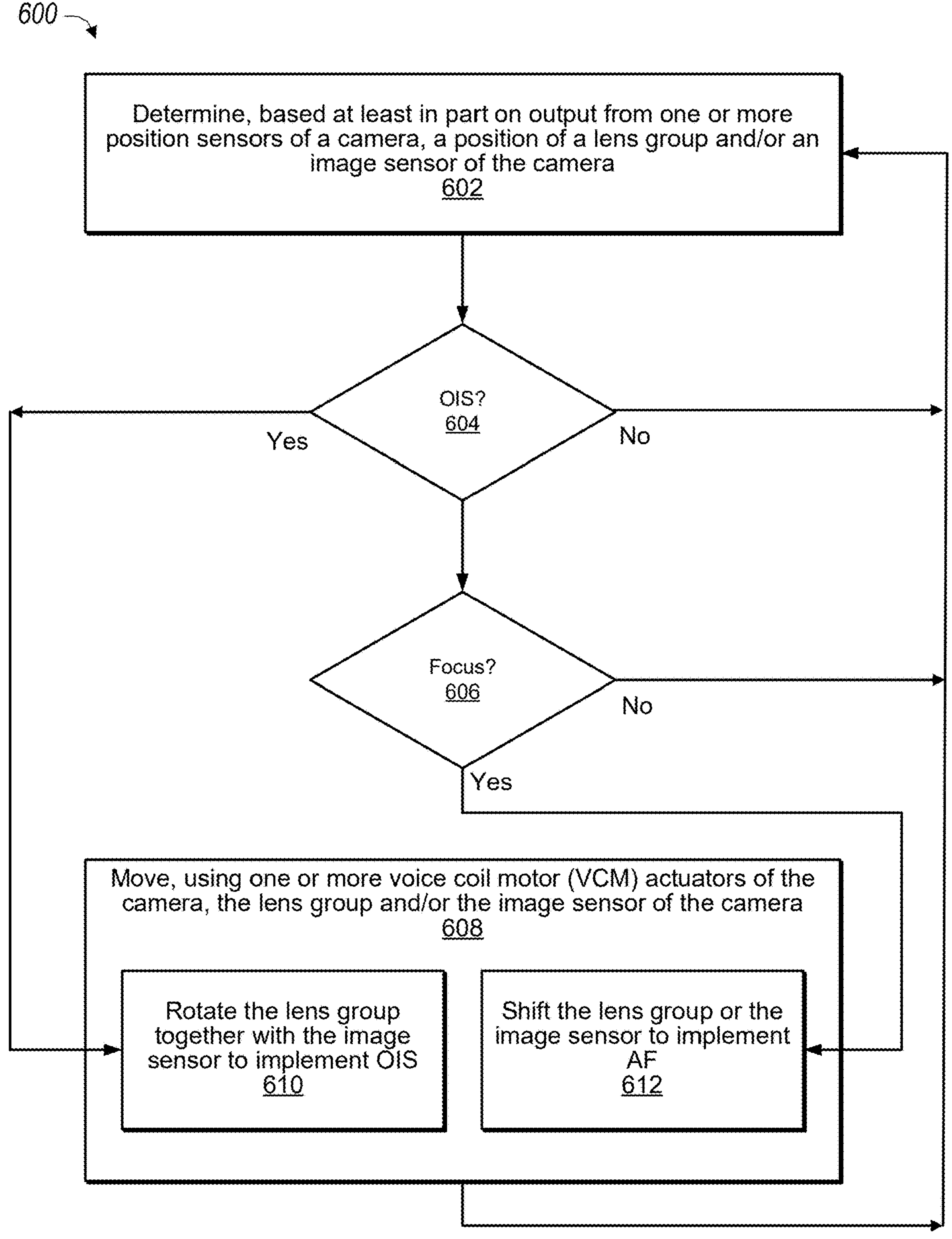
FIG. 6 is a flowchart that illustrates an example method of operating a camera system with an actuator arrangement for rotating a lens group and an image sensor to provide OIS, in accordance with some embodiments.

FIG. 6 is a flowchart that illustrates an example method 600 of operating a camera system with an actuator arrangement for rotating a lens group and an image sensor to provide optical image stabilization (OIS), in accordance with some embodiments.

At 602, the method 600 may include determining a position of a lens group and/or an image sensor of a camera. For example, the position of the lens group and/or the image sensor may be determined based at least in part on output from one or more position sensors of the camera, e.g., as also discussed herein with reference to FIGS. 2A and 4.

At 604, the method 600 may include determining whether OIS motion is triggered. For example, a current position of the lens group and/or the image sensor may be compared with a target tilt/OIS position of the image sensor. If the current position of the lens group and/or the image sensor is different from the target tilt/OIS position, then it may be determined that OIS motion is triggered. In some implementations, determining whether OIS motion is triggered may include determining whether the current position of the lens group and/or the image sensor is within a threshold value of the target tilt/OIS position.

At 606, the method 600 may include determining whether focus (e.g., AF) motion is triggered. For example, a current position of the lens group or the image sensor may be compared with a target focus position of the lens group or the image sensor. If the current position of the lens group or the image sensor is different from the target focus position, then it may be determined that AF motion is triggered. In some implementations, determining whether AF motion is triggered may include determining whether the current position of the lens group or the image sensor is within a threshold value of the target focus position.

If it is determined, at 604 and/or 606, that OIS and/or AF motion is triggered, then the method 600 may include moving, using one or more voice coil motor (VCM) actuators of the camera, the lens group and/or the image sensor of the camera (at 608). Moving the lens group and/or the image sensor may include providing (e.g., via a controller) an electric current to at least one of the drive coils of the VCM actuator(s). For example, if, at 604, it is determined that OIS motion is triggered, then the method 600 may include rotating the lens group together with the image sensor to implement OIS (at 610), e.g., as discussed herein with reference to FIGS. 1A-5. In some embodiments, implementing OIS may include providing electric current to a first OIS coil (e.g., an Rx OIS coil) to rotate the lens group, together with the image sensor, about a first axis orthogonal to an optical axis of the camera. Additionally, or alternatively, implementing OIS may include providing electric current to a second OIS coil (e.g., an Ry OIS coil) to rotate the lens group, together with the image sensor, about a second axis orthogonal to the optical axis and orthogonal to the first axis.

Additionally, or alternatively, if, at 606, it is determined that AF motion is triggered, then the method 600 may include shifting the lens group or the image sensor to implement AF (at 612), e.g., as discussed herein with reference to FIGS. 1A-5. In some examples, implementing AF may include providing electric current to an AF coil to move the image sensor, relative to the lens group, in at least one direction parallel to the optical axis.

In various implementations, the method 600 may include continuously and/or periodically determining the current position of the image sensor (at 602), then checking whether OIS and/or AF motion is triggered (at 604 and 606), etc.

Figure 7:
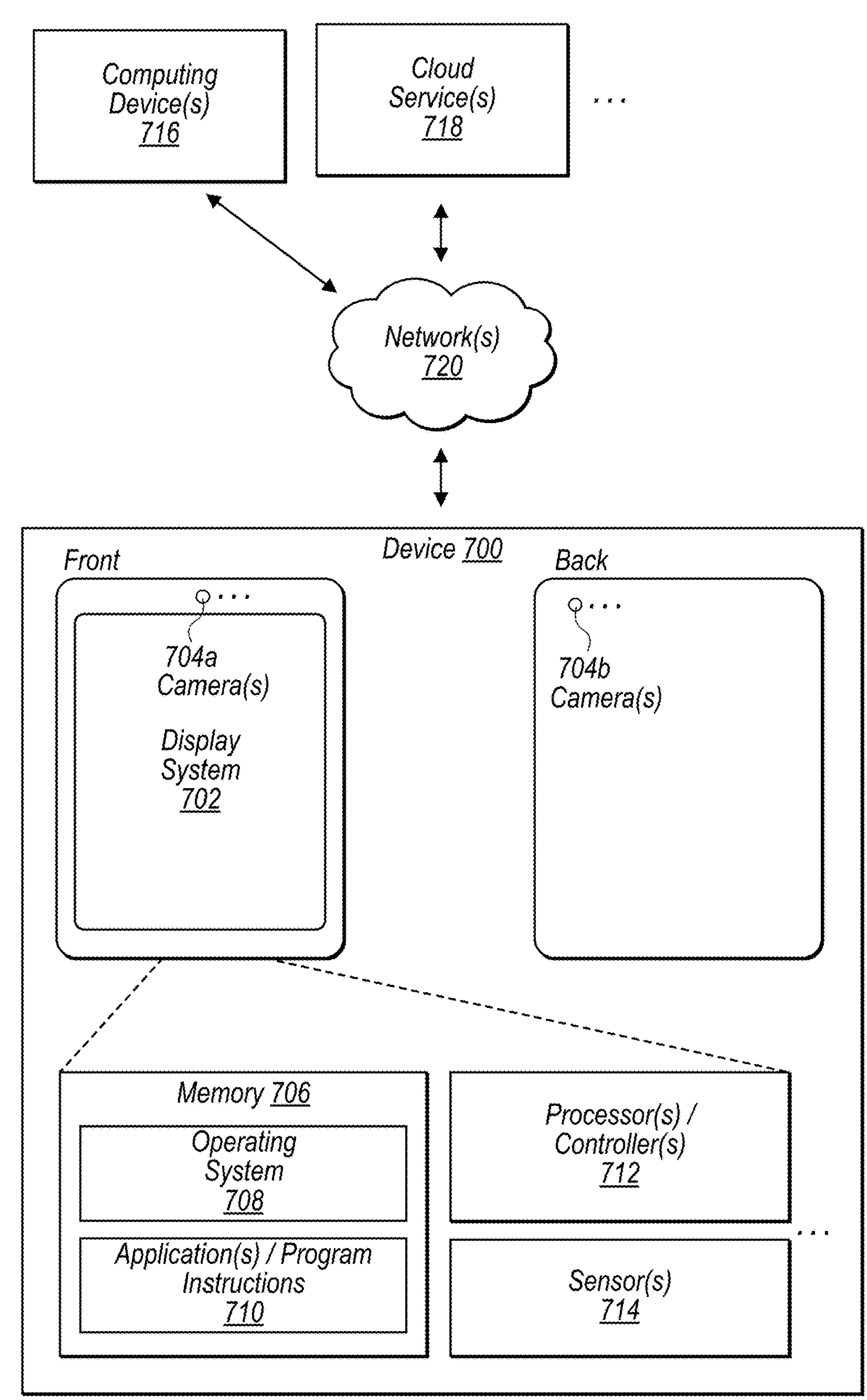
FIG. 7 illustrates a schematic representation of an example environment comprising a device that may include a camera system with an actuator arrangement for rotating a lens group and an image sensor to provide OIS, in accordance with some embodiments.

FIG. 7 illustrates a schematic representation of an example environment comprising a device 700 that may include one or more cameras. For example, the device 700 may include a camera system with an actuator arrangement for rotating a lens group and an image sensor to provide OIS, e.g., as described herein with reference to FIGS. 1A-6. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 704. In some non-limiting embodiments, the display system 702 and/or one or more front-facing cameras 704*a* may be provided at a front side of the device 700, e.g., as indicated in FIG. 7. Additionally, or alternatively, one or more rear-facing cameras 704*b* may be provided at a rear side of the device 700. In some embodiments comprising multiple cameras 704, some or all of the cameras 704 may be the same as, or similar to, each other. Additionally, or alternatively, some or all of the cameras 704 may be different from each other. In various embodiments, the location(s) and/or arrangement(s) of the camera(s) 704 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller(s), etc.), and/or one or more sensors 714 (e.g., orientation sensor(s), proximity sensor(s), and/or position sensor(s), etc.). In some embodiments, the device 700 may communicate with one or more other devices and/or services, such as computing device(s) 716, cloud service(s) 718, etc., via one or more networks 720. For example, the device 700 may include a network interface (e.g., network interface 810 in FIG. 8) that enables the device 700 to transmit data to, and receive data from, the network(s) 720. Additionally, or alternatively, the device 700 may be capable of communicating with other devices via wireless communication using any of a variety of communications standards, protocols, and/or technologies.

Figure 8:
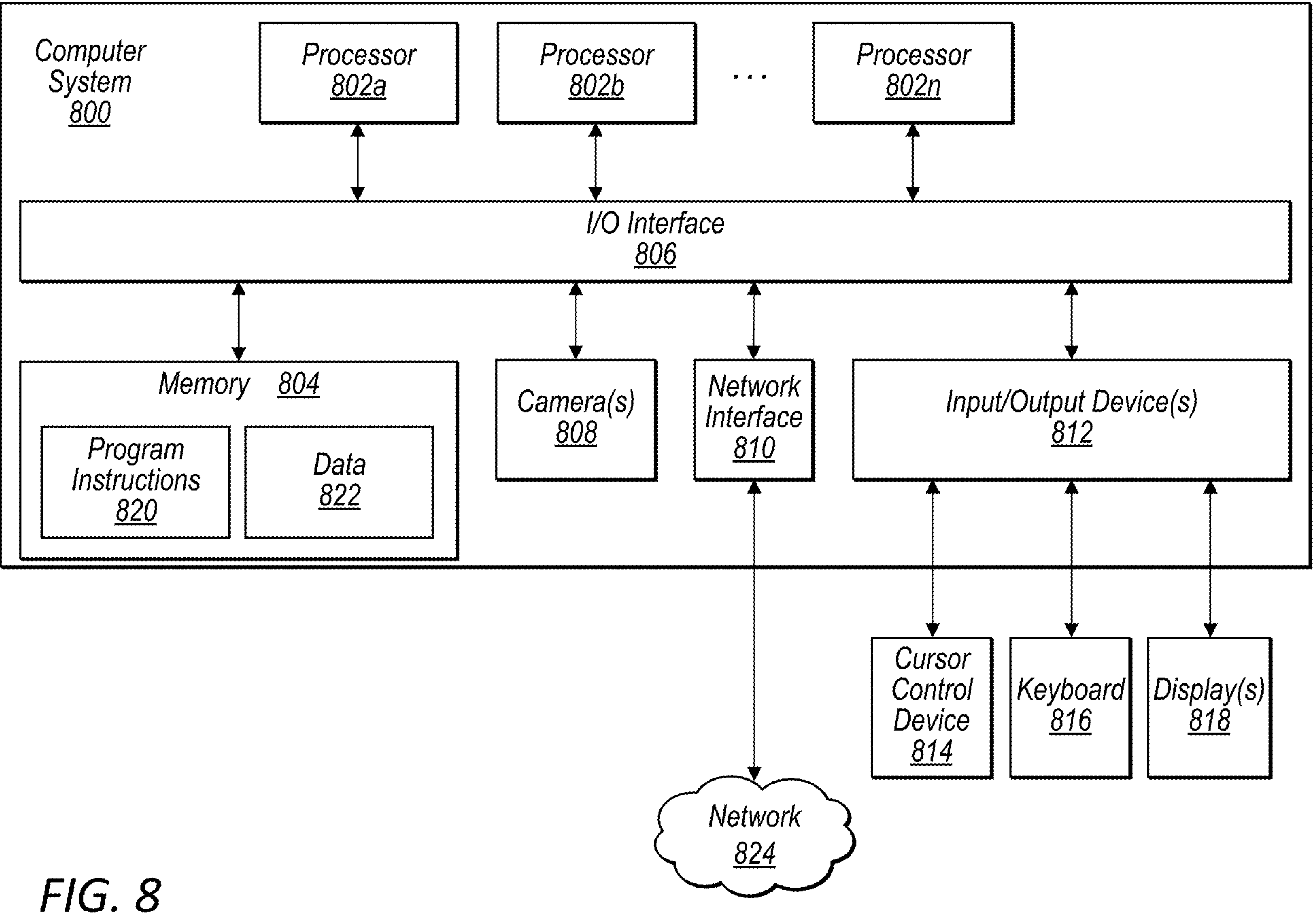
FIG. 8 illustrates a schematic block diagram of an example environment comprising a computer system that may include a camera system with an actuator arrangement for rotating a lens group and an image sensor to provide OIS, in accordance with some embodiments.

FIG. 8 illustrates a schematic block diagram of an example environment comprising a computer system 800 that may include a camera system with an actuator arrangement for rotating a lens group and an image sensor to provide OIS, e.g., as described herein with reference to FIGS. 1A-7. In addition, computer system 800 may implement methods for controlling operations of the camera and/or for performing image processing on images captured with the camera. In some embodiments, the device 700 (described herein with reference to FIG. 7) may additionally, or alternatively, include some or all of the functional components of the described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent, or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing, or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processors 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Additional descriptions of embodiments (example clauses):

Clause 1: A camera, comprising: a lens group comprising one or more lens elements that define an optical axis; an image sensor; and one or more actuators configured to: rotate the lens group and the image sensor together about multiple axes orthogonal to the optical axis; and shift the image sensor in at least one direction parallel to the optical axis.

Clause 2: The camera of Clause 1, wherein the one or more actuators comprise one or more voice coil motor (VCM) actuators.

Clause 3: The camera of Clause 2, wherein the one or more VCM actuators comprise: drive magnets; and drive coils; wherein a respective drive coil is positioned proximate a respective drive magnet such that the respective drive coil, when driven with an electric current, is capable of electromagnetically interacting with the respective drive magnet to enable: optical image stabilization (OIS) motion comprising rotation of the lens group, together with the image sensor, relative to a base structure of the camera; and autofocus (AF) motion comprising movement of the image sensor relative to the lens group.

Clause 4: The camera of Clause 3, wherein the drive coils are fixed drive coils that are coupled with one or more stationary components of the camera; and the drive magnets are movable drive magnets that are coupled with one or more movable components of the camera.

Clause 5: The camera of any one of Clauses 1-4, further comprising: a suspension arrangement, comprising: a first movable component coupled with the lens group; and a second movable component coupled with the image sensor; wherein the suspension arrangement is configured to suspend the lens group and the image sensor and to allow motion enabled by the one or more actuators.

Clause 6: The camera of Clause 5, wherein the suspension arrangement comprises: a ball bearing suspension arrangement comprising multiple stages that move on ball bearings.

Clause 7: The camera of any one of Clauses 1-6, further comprising: a dynamic flex circuit, comprising: a first portion coupled with one or more stationary components of the camera; a second portion coupled with the image sensor; and a third portion extending from the first portion to the second portion; wherein the dynamic flex circuit is configured to convey electrical signals between the first portion and the second portion, and wherein the third portion has sufficient service loop to allow motion of the image sensor enabled by the one or more actuators.

Clause 8: A device, comprising: one or more processors; memory storing program instructions executable by the one or more processors to control operations of a camera; and the camera, comprising: a lens group comprising one or more lens elements that define an optical axis; an image sensor; and one or more actuators configured to: rotate the lens group and the image sensor together about multiple axes orthogonal to the optical axis; and shift the image sensor in at least one direction parallel to the optical axis.

Clause 9: The device of Clause 8, wherein the one or more actuators comprise one or more voice coil motor (VCM) actuators, and wherein the one or more VCM actuators comprise: drive magnets; and drive coils; wherein a respective drive coil is positioned proximate a respective drive coil such that the respective drive coil, when driven with an electric current, is capable of electromagnetically interacting with the respective drive magnet to enable: optical image stabilization (OIS) motion comprising rotation of the lens group, together with the image sensor, relative to a base structure of the camera; and autofocus (AF) motion comprising movement of the lens group or the image sensor in at least one direction parallel to an optical axis of the camera.

Clause 10: The device of Clause 9, wherein the camera further comprises: a ball bearing suspension arrangement comprising multiple stages that move on ball bearings to suspend the lens group and the image sensor and to allow motion enabled by the one or more VCM actuators.

Clause 11: The device of Clause 10, wherein: the drive magnets comprise: an AF magnet fixedly coupled with an AF stage of the multiple stages of the ball bearing suspension arrangement; a first OIS magnet fixedly coupled with an OIS stage of the multiple stages; and a second OIS magnet fixedly coupled with the OIS stage; and the drive coils comprise: an AF coil fixedly coupled with the base structure and positioned proximate the AF magnet; a first OIS coil fixedly coupled with the base structure and positioned proximate the first OIS magnet; and a second OIS coil fixedly coupled with the base structure and positioned proximate the second OIS magnet.

Clause 12: The device of Clause 11, wherein the camera further comprises: a drive flex circuit wrapped around at least a portion of the base structure; wherein: the first OIS coil is coupled with the drive flex circuit and positioned at a first side of the camera; the second OIS coil is coupled with the drive flex circuit and positioned at a second side of the camera; and the AF coil is coupled with the drive flex circuit and positioned at a third side of the camera, wherein the third side is opposite the second side relative to the lens group.

Clause 13: The device of Clause 12, wherein the camera further comprises: an AF position sensor coupled with the drive flex circuit and encircled by the AF coil; a first OIS position sensor coupled with the drive flex circuit and encircled by the first OIS coil; and a second OIS position sensor coupled with the drive flex circuit and encircled by the second OIS coil.

Clause 14: The device of any one of Clauses 10-13, wherein the multiple stages of the ball bearing suspension arrangement comprise: the multiple stages of the ball bearing suspension arrangement comprise: an AF stage with which the image sensor is fixedly coupled; a first OIS stage with which the lens group is fixedly coupled; and a second OIS stage; the first OIS stage is capable of pivoting on a first set of ball bearings disposed between the first OIS stage and the second OIS stage, so as to rotate the first OIS stage, together with the AF stage, about a first axis orthogonal to the optical axis of the camera; the second OIS stage is capable of pivoting on a second set of ball bearings disposed between the second OIS stage and the base structure, so as to rotate the second OIS stage, together with the first OIS stage and the AF stage, relative to the base structure, about a second axis orthogonal to the optical axis and orthogonal to the first axis; and the AF stage is capable of moving on a third set of ball bearings disposed between the AF stage and the first OIS stage, so as to shift the AF stage, relative to the first OIS stage, in at least one direction parallel to the optical axis.

Clause 15: The device of Clause 14, wherein the camera further comprises: a first set of preload magnetic elements for preloading the first set of ball bearings; a second set of preload magnetic elements for preloading the second set of ball bearings; and a third set of preload magnetic elements for preloading the third set of ball bearings.

Clause 16: The device of Clause 15, wherein: the first set of preload magnetic elements comprise: a first magnetic element coupled with the first OIS stage; and a second magnetic element coupled with the second OIS stage and positioned proximate the first magnetic element such that the first magnetic element and the second magnetic element magnetically interact with each other to provide a force that attracts the first OIS stage and the second OIS stage to each other; the second set of preload magnetic elements comprise: a third magnetic element coupled with the second OIS stage; and a fourth magnetic element coupled with the base structure and positioned proximate the third magnetic element such that the third magnetic element and the fourth magnetic element magnetically interact with each other to provide a force that attracts the second OIS stage and the base structure to each other; and the third set of preload magnetic elements comprise: a fifth magnetic element coupled with the first OIS stage; and a sixth magnetic element coupled with the AF stage and positioned proximate the fifth magnetic element such that the fifth magnetic element and the sixth magnetic element magnetically interact with each other to provide a force that attracts the first OIS stage and the AF stage to each other.

Clause 17: The device of Clause 16, wherein the fifth magnetic element coupled with the first OIS stage comprises a drive magnet of the drive magnets.

Clause 18: A method, comprising: rotating, using one or more actuators of a camera, a lens group of the camera, together with an image sensor of the camera, about a first axis orthogonal to an optical axis of the camera, wherein the one or more actuators are further configured to: rotate the lens group, together with the image sensor, about a second axis orthogonal to the optical axis and orthogonal to the first axis; and shift the image sensor in at least one direction parallel to the optical axis.

Clause 19: The method of Clause 18, further comprising: rotating, using the one or more actuators, the lens group, together with the image sensor, about the second axis.

Clause 20: The method of Clause 18 or Clause 19, wherein: the one or more actuators comprise one or more voice coil motor (VCM) actuators; the one or more VCM actuators comprise: drive magnets, comprising: an AF magnet; a first OIS magnet; and a second OIS magnet; and drive coils, comprising: an AF coil located proximate the AF magnet; a first OIS coil located proximate the first OIS magnet; and a second OIS coil located proximate the second OIS magnet. the rotating the lens group, together with the image sensor, about the first axis comprises: supplying a first OIS drive current to the first OIS coil so that the first OIS coil electromagnetically interacts with the first OIS magnet to produce a first Lorentz force that causes rotation of the lens group and the image sensor about the first axis; and the rotating the lens group, together with the image sensor, about the second axis comprises: supplying a second OIS drive current to the second OIS coil so that the second OIS coil electromagnetically interacts with the second OIS magnet to produce a second Lorentz force that causes rotation of the lens group and the image sensor about the second axis.

Clause 21: A camera, comprising: a lens group; an image sensor; and an actuator arrangement, comprising: an optical image stabilization (OIS) actuator, comprising: OIS actuator components configured to enable OIS motion comprising rotation of the lens group and the image sensor together about multiple axes orthogonal to an optical axis of the camera; and an autofocus (AF) actuator, comprising: AF actuator components configured to enable AF motion comprising movement of the lens group or the image sensor in at least one direction parallel to the optical axis; wherein the OIS actuator is at least partially integrated with the AF actuator in an integrated architecture characterized by at least one of: the OIS actuator and the AF actuator sharing at least one shared actuator component that is included in the OIS actuator components and the AF actuator components, wherein the at least one shared actuator component is used for enabling both OIS motion and AF motion; or one or more of the OIS actuator components and one or more of the AF actuator components being mounted on a same component of the camera.

Clause 22: The camera of Clause 21, further comprising: an outer shield can that at least partially encases the camera; wherein the camera does not include an inner shield can disposed between the outer shield can and the lens group.

Clause 23: The camera of Clause 21 or Clause 22, wherein the OIS actuator components and the AF actuator components are not separated from one another by a shield can.

Clause 24: The camera of any one of Clauses 21-23, wherein the actuator arrangement comprises one or more voice coil motor (VCM) actuators.

Clause 25: The camera of any one of Clauses 21-24, wherein: the lens group comprises one or more lens elements that define the optical axis; and the multiple axes about which the lens group and the image sensor can be rotated comprise: a first axis orthogonal to the optical axis; and a second axis orthogonal to the optical axis and orthogonal to the first axis.

Clause 26: The camera of any one of Clauses 21-25, wherein, to provide AF motion, the AF actuator is configured to: shift the lens group, relative to the image sensor, in the at least one direction parallel to the optical axis.

Clause 27: The camera of any one of Clauses 21-25, wherein, to provide AF motion, the AF actuator is configured to: shift the image sensor, relative to the lens group, in the at least one direction parallel to the optical axis.

Clause 28: The camera of any one of Clauses 21-27, further comprising: a ball bearing suspension arrangement comprising multiple stages that move on ball bearings to suspend the lens group and the image sensor and to allow motion enabled by the actuator arrangement.

Clause 29: The camera of any one of Clauses 21-28, wherein: the OIS actuator and the AF actuator comprise voice coil motor (VCM) actuators; and the integrated architecture is characterized at least in part by: the OIS actuator and the AF actuator sharing the at least one shared actuator component that is included in the OIS actuator components and the AF actuator components, wherein the at least one shared actuator component comprises at least one of a drive magnet or a drive coil of the VCM actuators.

Clause 30: The camera of any one of Clauses 21-29, wherein: the OIS actuator comprises an OIS VCM actuator that includes an OIS drive magnet and an OIS drive coil; the AF actuator comprises an AF VCM actuator that includes an AF drive magnet and an AF drive coil; and the integrated architecture is characterized at least in part by: one or more of the OIS actuator components and one or more of the AF actuator components being mounted on a same component of the camera, wherein: the one or more of the OIS actuator components comprise at least one of the OIS drive magnet or the OIS drive coil; and the one or more of the AF actuator components comprise at least one of the AF drive magnet or the AF drive coil.

Clause 31: A device, comprising: one or more processors; memory storing program instructions executable by the one or more processors to control operations of a camera; and the camera, comprising: a lens group; an image sensor; and an actuator arrangement, comprising: an optical image stabilization (OIS) actuator, comprising: OIS actuator components configured to enable OIS motion comprising rotation of the lens group and the image sensor together about multiple axes orthogonal to an optical axis of the camera; and an autofocus (AF) actuator, comprising: AF actuator components configured to enable AF motion comprising movement of the lens group or the image sensor in at least one direction parallel to the optical axis; wherein the OIS actuator is at least partially integrated with the AF actuator in an integrated architecture characterized by at least one of: the OIS actuator and the AF actuator sharing at least one shared actuator component that is included in the OIS actuator components and the AF actuator components, wherein the at least one shared actuator component is used for enabling both OIS motion and AF motion; or one or more of the OIS actuator components and one or more of the AF actuator components being mounted on a same component of the camera.

Clause 32: The device of Clause 31, wherein the camera further comprises: an outer shield can that at least partially encases the camera; wherein the camera does not include an inner shield can disposed between the outer shield can and the lens group.

Clause 33: The device of Clause 31 or Clause 32, wherein the OIS actuator components and the AF actuator components are not separated from one another by a shield can.

Clause 34: The device of any one of Clauses 31-33, wherein the actuator arrangement comprises one or more voice coil motor (VCM) actuators.

Clause 35: The device of any one of Clauses 31-34, wherein, to provide AF motion, the AF actuator is configured to: shift the lens group, relative to the image sensor, in the at least one direction parallel to the optical axis.

Clause 36: The device of any one of Clauses 31-35, wherein, to provide AF motion, the AF actuator is configured to: shift the image sensor, relative to the lens group, in the at least one direction parallel to the optical axis.

Clause 37: The device of any one of Clauses 31-36, wherein the camera further comprises: a ball bearing suspension arrangement comprising multiple stages that move on ball bearings to suspend the lens group and the image sensor and to allow motion enabled by the actuator arrangement.

Clause 38: A system, comprising: an actuator arrangement, comprising: an optical image stabilization (OIS) actuator, comprising: OIS actuator components configured to enable OIS motion comprising rotation of a lens group of a camera, together with an image sensor of a camera, about multiple axes orthogonal to an optical axis of the camera; an autofocus (AF) actuator, comprising: AF actuator components configured to enable AF motion comprising movement of the lens group or the image sensor in at least one direction parallel to the optical axis; wherein the OIS actuator is at least partially integrated with the AF actuator in an integrated architecture characterized by at least one of: the OIS actuator and the AF actuator sharing at least one shared actuator component that is included in the OIS actuator components and the AF actuator components, wherein the at least one shared actuator component is used for enabling both OIS motion and AF motion; or one or more of the OIS actuator components and one or more of the AF actuator components being mounted on a same component of the camera; and a suspension arrangement that suspends the lens group and the image sensor and that allows motion enabled by the actuator arrangement.

Clause 39: The system of Clause 38, wherein the OIS actuator and the AF actuator comprise voice coil motor (VCM) actuators.

Clause 40: The system of Clause 39, wherein the suspension arrangement comprises: a ball bearing suspension arrangement comprising multiple stages that move on ball bearings to suspend the lens group and the image sensor and to allow motion enabled by the VCM actuators.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:

a lens group;

an image sensor; and an actuator arrangement, comprising:

an optical image stabilization (OIS) actuator, comprising:

OIS actuator components configured to enable OIS motion comprising rotation of the lens group and the image sensor together about multiple axes orthogonal to an optical axis of the camera; and an autofocus (AF) actuator, comprising:

AF actuator components configured to enable AF motion comprising movement of the lens group or the image sensor in at least one direction parallel to the optical axis;

wherein the OIS actuator is at least partially integrated with the AF actuator in an integrated architecture where:

the OIS actuator and the AF actuator share at least one shared actuator component that is included in the OIS actuator components and the AF actuator components, wherein the at least one shared actuator component is used for enabling both OIS motion and AF motion, or one or more of the OIS actuator components and one or more of the AF actuator components are mounted on a same component of the camera.

2. The camera of claim 1, further comprising:

an outer shield can that at least partially encases the camera;

wherein the camera does not include an inner shield can disposed between the outer shield can and the lens group.

3. The camera of claim 1, wherein the OIS actuator components and the AF actuator components are not separated from one another by a shield can.

4. The camera of claim 1, wherein the actuator arrangement comprises one or more voice coil motor (VCM) actuators.

5. The camera of claim 1, wherein:

the lens group comprises one or more lens elements that define the optical axis; and the multiple axes about which the lens group and the image sensor can be rotated comprise:

a first axis orthogonal to the optical axis; and a second axis orthogonal to the optical axis and orthogonal to the first axis.

6. The camera of claim 5, wherein, to provide AF motion, the AF actuator is configured to:

shift the lens group, relative to the image sensor, in the at least one direction parallel to the optical axis.

7. The camera of claim 5, wherein, to provide AF motion, the AF actuator is configured to:

shift the image sensor, relative to the lens group, in the at least one direction parallel to the optical axis.

8. The camera of claim 1, further comprising:

a ball bearing suspension arrangement comprising multiple stages that move on ball bearings to suspend the lens group and the image sensor and to allow motion enabled by the actuator arrangement.

9. The camera of claim 1, wherein:

the OIS actuator and the AF actuator comprise voice coil motor (VCM) actuators; and the integrated architecture comprises:

the OIS actuator and the AF actuator sharing the at least one shared actuator component that is included in the OIS actuator components and the AF actuator components, wherein the at least one shared actuator component comprises at least one of a drive magnet or a drive coil of the VCM actuators.

10. The camera of claim 1, wherein:

the OIS actuator comprises an OIS VCM actuator that includes an OIS drive magnet and an OIS drive coil;

the AF actuator comprises an AF VCM actuator that includes an AF drive magnet and an AF drive coil; and the integrated architecture comprising:

one or more of the OIS actuator components and one or more of the AF actuator components being mounted on a same component of the camera, wherein:

the one or more of the OIS actuator components comprise at least one of the OIS drive magnet or the OIS drive coil; and the one or more of the AF actuator components comprise at least one of the AF drive magnet or the AF drive coil.

11. A device, comprising:

one or more processors;

memory storing program instructions executable by the one or more processors to control operations of a camera; and the camera, comprising:

a lens group;

an image sensor; and an actuator arrangement, comprising:

an optical image stabilization (OIS) actuator, comprising:

OIS actuator components configured to enable OIS motion comprising rotation of the lens group and the image sensor together about multiple axes orthogonal to an optical axis of the camera; and an autofocus (AF) actuator, comprising:

AF actuator components configured to enable AF motion comprising movement of the lens group or the image sensor in at least one direction parallel to the optical axis;

wherein the OIS actuator is at least partially integrated with the AF actuator in an integrated architecture comprising at least one of:

the OIS actuator and the AF actuator sharing at least one shared actuator component that is included in the OIS actuator components and the AF actuator components, wherein the at least one shared actuator component is used for enabling both OIS motion and AF motion, or one or more of the OIS actuator components and one or more of the AF actuator components being mounted on a same component of the camera.

12. The device of claim 11, wherein the camera further comprises:

an outer shield can that at least partially encases the camera;

wherein the camera does not include an inner shield can disposed between the outer shield can and the lens group.

13. The device of claim 11, wherein the OIS actuator components and the AF actuator components are not separated from one another by a shield can.

14. The device of claim 11, wherein the actuator arrangement comprises one or more voice coil motor (VCM) actuators.

15. The device of claim 11, wherein, to provide AF motion, the AF actuator is configured to:

shift the lens group, relative to the image sensor, in the at least one direction parallel to the optical axis.

16. The device of claim 11, wherein, to provide AF motion, the AF actuator is configured to:

shift the image sensor, relative to the lens group, in the at least one direction parallel to the optical axis.

17. The device of claim 11, wherein the camera further comprises:

a ball bearing suspension arrangement comprising multiple stages that move on ball bearings to suspend the lens group and the image sensor and to allow motion enabled by the actuator arrangement.

18. A system, comprising:

an actuator arrangement, comprising:

an optical image stabilization (OIS) actuator, comprising:

OIS actuator components configured to enable OIS motion comprising rotation of a lens group of a camera, together with an image sensor of a camera, about multiple axes orthogonal to an optical axis of the camera;

an autofocus (AF) actuator, comprising:

AF actuator components configured to enable AF motion comprising movement of the lens group or the image sensor in at least one direction parallel to the optical axis;

wherein the OIS actuator is at least partially integrated with the AF actuator in an integrated architecture comprising at least one of:

the OIS actuator and the AF actuator sharing at least one shared actuator component that is included in the OIS actuator components and the AF actuator components, wherein the at least one shared actuator component is used for enabling both OIS motion and AF motion, or one or more of the OIS actuator components and one or more of the AF actuator components being mounted on a same component of the camera; and a suspension arrangement that suspends the lens group and the image sensor and that allows motion enabled by the actuator arrangement.

19. The system of claim 18, wherein the OIS actuator and the AF actuator comprise voice coil motor (VCM) actuators.

20. The system of claim 19, wherein the suspension arrangement comprises:

a ball bearing suspension arrangement comprising multiple stages that move on ball bearings to suspend the lens group and the image sensor and to allow motion enabled by the VCM actuators.

* * * * *